United States Patent
Ohta et al.

(10) Patent No.: US 6,493,027 B2
(45) Date of Patent: *Dec. 10, 2002

(54) APPARATUS FOR STILL AND MOVING IMAGE RECORDING AND CONTROL THEREOF

(75) Inventors: Seiya Ohta, Kanagawa-ken (JP); Kitahiro Kaneda, Kanagawa-ken (JP); Hirofumi Takei, Kanagawa-ken (JP); Taeko Tanaka, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,621

(22) Filed: Aug. 22, 1997

(65) Prior Publication Data

US 2001/0040626 A1 Nov. 15, 2001

Related U.S. Application Data

(62) Division of application No. 08/351,740, filed on Dec. 8, 1994, now Pat. No. 5,703,638, which is a continuation of application No. 07/948,001, filed on Sep. 21, 1992, now abandoned.

(30) Foreign Application Priority Data

Sep. 25, 1991 (JP) .............................................. 3-245692
Oct. 21, 1991 (JP) .............................................. 3-272627
Nov. 8, 1991 (JP) .............................................. 3-293238
Jan. 21, 1992 (JP) .............................................. 4-008654
Jan. 28, 1992 (JP) .............................................. 4-012936

(51) Int. Cl.$^7$ .............................................. H04N 5/225
(52) U.S. Cl. ..................................... 348/220; 348/223
(58) Field of Search .............................. 348/208, 220, 348/221, 223, 224, 229, 347, 358, 362, 345, 349, 222; 386/8

(56) References Cited

U.S. PATENT DOCUMENTS

| | | | |
|---|---|---|---|
| 4,780,766 A | * 10/1988 | Nutting | 348/229 |
| 4,899,212 A | * 2/1990 | Kaneko et al. | 348/220 |
| 5,276,563 A | * 1/1994 | Ogawa | 348/220 |
| 5,339,163 A | * 8/1994 | Homma et al. | 348/229 |
| 5,341,190 A | * 8/1994 | Ogawa | 348/221 |

* cited by examiner

Primary Examiner—Tuan Ho
(74) Attorney, Agent, or Firm—Robin, Blecker & Daley

(57) ABSTRACT

An image pickup apparatus capable of performing shooting action control appositely to each of different modes of shooting such as moving image shooting and still image shooting includes an instructing part for selectively instructing the apparatus to perform moving image shooting or still image shooting, and a control part for variably setting control characteristics for various control actions such as backlight correction control, white balance control, automatic focusing control, shutter speed control, etc., according to the instruction of the instructing part.

5 Claims, 26 Drawing Sheets

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

FIG. 27(A)

| SHUTTER SPEED | APERTURE |
|---|---|
| 1/60 SEC | — |
| 1/125 SEC | OPEN BY ONE STEP |
| 1/250 SEC | OPEN BY TWO STEPS |
| 1/500 SEC | OPEN BY THREE STEPS |

FIG. 27(B)

| SHUTTER SPEED | AGC GAIN |
|---|---|
| 1/60 SEC | FULL-OPEN APERTURE |
| 1/125 SEC | 6 dB UP |
| 1/250 SEC | 12 dB UP |
| 1/500 SEC | 18 dB UP |

APPARATUS FOR STILL AND MOVING IMAGE RECORDING AND CONTROL THEREOF

This application is a division of application Ser. No. 08/351,740, filed Dec. 8, 1994, U.S. Pat. No. 5,703,638, which is a continuation of Ser. No. 07/948,001, filed Sep. 21, 1992, abandoned.

BACKGROUND OF THE INVENTION

1. Field of the Invention

This invention relates to an image pickup apparatus, such as a video camera, arranged to be capable of operating in completely different image shooting modes such as moving image shooting and still image shooting.

2. Description of the Related Art

A demand for high-density recording has recently increased in the field of magnetic recording. To meet this demand, video tape recorders (hereinafter referred to as VTRs) have come to be arranged to perform recording at a higher density by lowering the traveling speed of the tape. The lower traveling speed of the tape, however, brings about a problem which is as follows: In a case where an audio signal is recorded with a fixed head, for example, the quality of reproduced sounds degrades as it is impossible to make the relative speed of the tape and the fixed head sufficiently high. In one of methods for solving this problem, the length of recording tracks to be scanned by a rotary head on the tape is extended to be longer than the conventional length and an audio signal which has been time-base compressed is recorded within the extension area of the tracks. More specifically, this method is carried out in the following manner: While it has been practiced to wrap the magnetic tape at least 180 degrees around a rotary cylinder in the case of a rotary 2-head helical scanning type VTR, the tape is wrapped, according to this method, at least (180+θ) degrees around the rotary cylinder; and an audio signal which has been pulse-code modulated (PCM) and time-base compressed is recorded within the extra wrapped part corresponding to the additional degree θ.

FIG. 1 shows the tape transport system of the VTR of the above-stated kind. FIG. 2 shows recording tracks formed on a magnetic tape by the VTR of FIG. 1. In FIG. 1, a reference numeral 1 denotes a magnetic tape. A numeral 2 denotes a rotary cylinder. Numerals 3 and 4 denote heads mounted on the rotary cylinder 2. In FIG. 2, A numeral 5 denotes a video signal recording area of the recording track formed on the magnetic tape 1. A numeral 6 denotes a PCM audio signal recording area of the recording track. The video signal recording area 5 is arranged to be traced by the heads 3 and 4 within the angle range of 180 degrees around the rotary cylinder 2, and the PCM audio signal recording area 6 is arranged to be traced within the additional angle range of θ around the rotary cylinder 2.

As one application example of the method of recording a digital signal in another area while a video signal is recorded within one area as mentioned above, a method of recording a still image within the digital signal recording area 6 in the form of a digital signal has been proposed. Information on one still image can be completely recorded on the magnetic tape 1 by scanning a plurality of the PCM signal recording areas 6. This method not only enables one and the same image pickup apparatus to use one and the same recording medium for still image shooting as well as for moving image shooting but also makes it possible to obtain a still image of a higher picture quality than a still image obtainable by the conventional VTR by reproducing a video signal from one and the same track by stopping the tape travel.

It has been also proposed to combine a recording apparatus of the above-stated kind with a camera into a camera-integrated type VTR (hereinafter referred to as a video camera) which permits still image shooting as well as moving image shooting.

The video camera of the above-stated kind is provided with various automatic control functions such as an automatic white balance control function and an automatic focus control function for optimum image pickup. To carry out these functions, the video camera is provided also with various moving parts such as an actuator for an optical system, etc.

However, the characteristics of these functions are arranged to be optimum only for moving image shooting in general. It has been, therefore, a shortcoming of the conventional video camera of the above-stated kind that the still image shooting cannot be accomplished in an optimum manner because of such characteristics.

SUMMARY OF THE INVENTION

This invention is directed to the solution of the problem of the prior art. It is, therefore, an object of the invention to provide an image pickup apparatus which is capable of recording still images in an optimum state as well as moving images by itself.

It is another object of the invention to provide an image pickup apparatus which is arranged to permit smooth switching from moving image shooting over to still image shooting.

To attain these objects, an image pickup apparatus which is arranged as an embodiment of this invention comprises: image pickup means arranged to convert image pickup light obtained from an object into an electrical signal; instructing means arranged to give an instruction for moving image shooting or for still image shooting; driving-control means for driving-control over moving image shooting and still image shooting with predetermined different control characteristics; and setting means for setting the different control characteristics according to the instruction of the instructing means.

The embodiment is capable of performing under apposite control conditions not only the moving image shooting but also the still image shooting.

With the control characteristics appropriately set, switchover from the moving image shooting to the still image shooting can be smoothly accomplished.

Further, this invention is not limited to the moving image shooting and the still image shooting but is also applied to any cases where the image pickup is to be performed in any of different modes by a single apparatus.

These and other objects and features of this invention will become apparent from the following detailed description of embodiments thereof taken in connection with the accompanying drawings.

BRIEF DESCRIPTION OF THE DRAWINGS

FIGS. 27(A) and 27(B) show shutter speeds as in relation to aperture values.

DETAILED DESCRIPTION OF THE PREFERRED EMBODIMENTS

The following describes embodiments of this invention with the features of them first described in outline as follows:

A magnetic recording apparatus arranged as an embodiment of this invention to be capable of recording a still image along with a moving image is characterized in that the embodiment is provided with detecting means for detecting a release signal for recording a still image, and control means arranged to inhibit any driving-control over a driving part included in a photo-taking optical system when the release signal is detected by the detecting means while the apparatus is in the mode of still image recording.

A magnetic recording apparatus arranged as another embodiment of this invention to be capable of recording a still image along with a moving image is characterized in that the embodiment is provided with detecting means for detecting the state of a camera control action when the apparatus is in the mode of still image recording, and control means arranged to inhibit a release for still image recording when the camera control action is determined to be in a transition period on the basis of a detection signal provided by the detecting means.

In one mode of the above-stated embodiment, the camera control action is considered to be at least one of control actions including white balance control, aperture control and automatic gain control.

In the magnetic recording apparatus which is arranged as the above-stated embodiment and is capable of both moving image recording and still image recording, an actuator provided for driving the optical system is forcibly inhibited from driving when a release is made for still image recording, so that an image shake can be prevented to ensure sharp still image shooting.

Further, in recording a still image with the magnetic recording apparatus which is capable of recording both a moving image and a still image, the operating state of camera control is monitored and a release action is inhibited if the camera control is found to be in a transition period. Therefore, the still image recording action can be prevented from being performed under any condition inapposite to shooting.

The details of the embodiments are as described below with reference to the accompanying drawings:

Embodiment I

Figure 1:
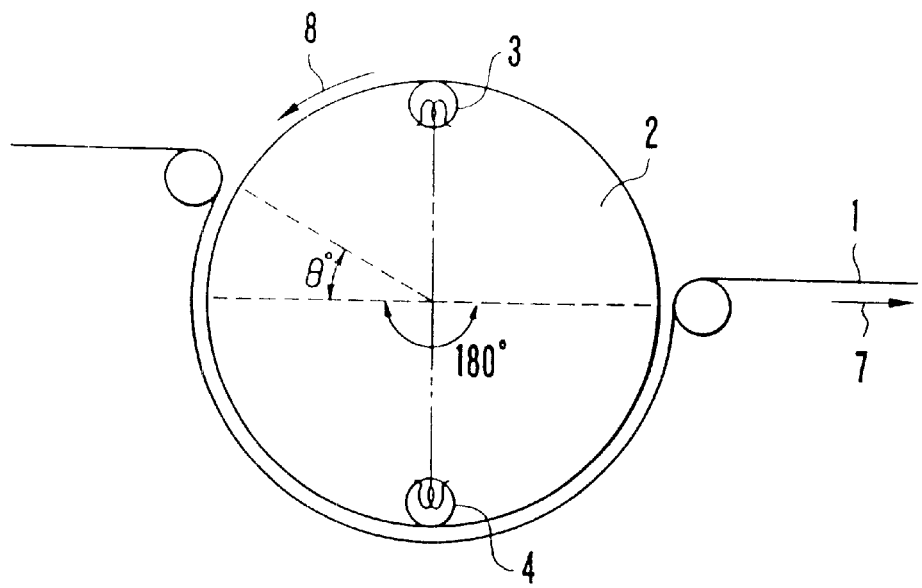
FIG. 1 is a plan view showing in outline a tape transport system employed in the conventional magnetic recording apparatus.
Figure 2:
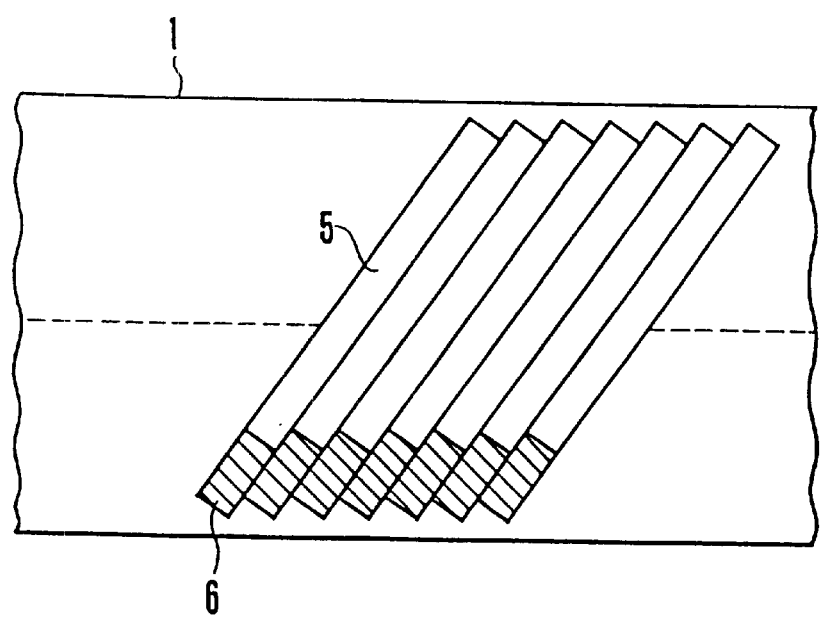
FIG. 2 conceptually shows recording tracks formed on a magnetic tape by the magnetic recording apparatus shown in FIG. 1.
Figure 3:
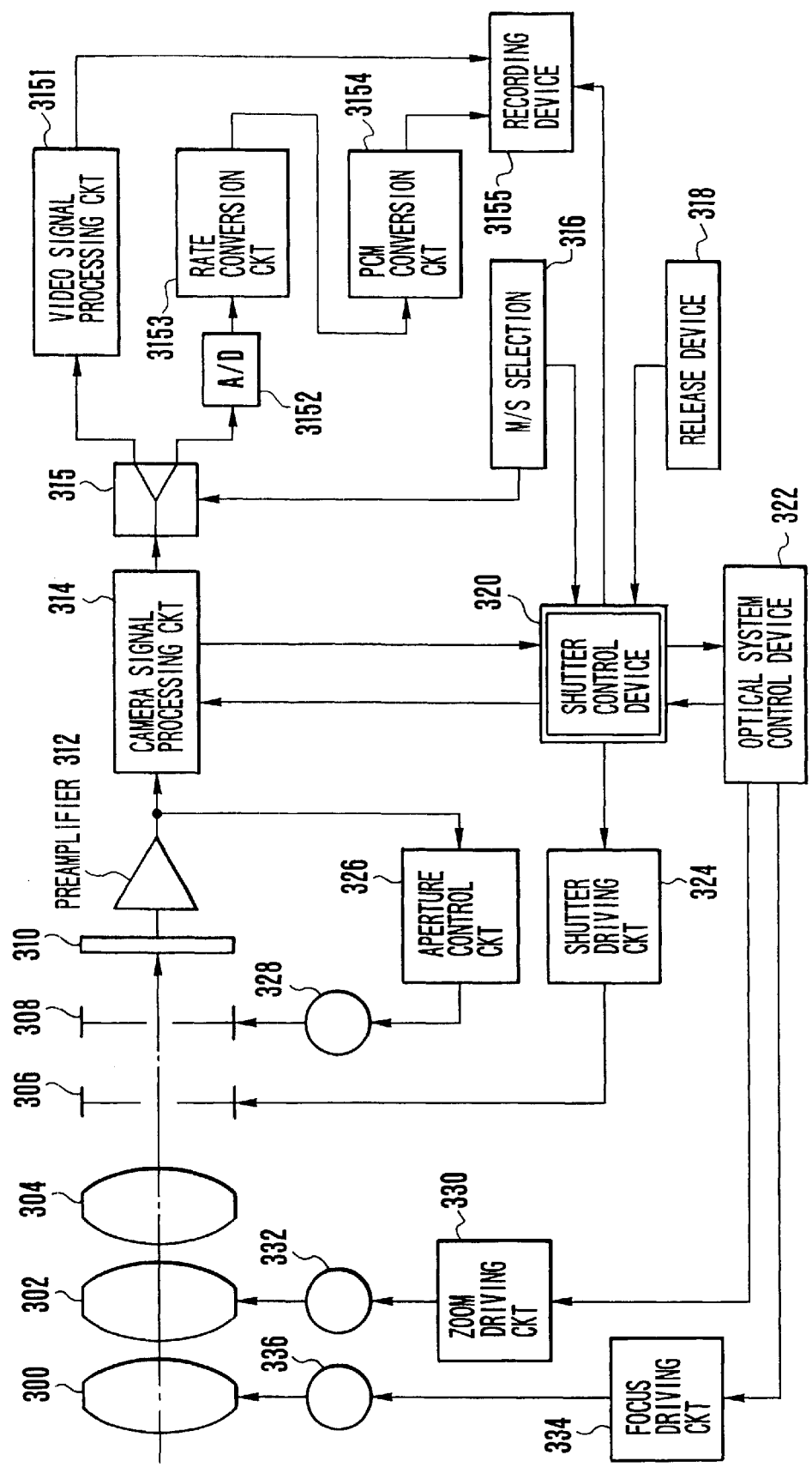
FIG. 3 is a block diagram showing the circuit arrangement of a video camera which is arranged according to this invention as a first embodiment thereof.
Figure 4:
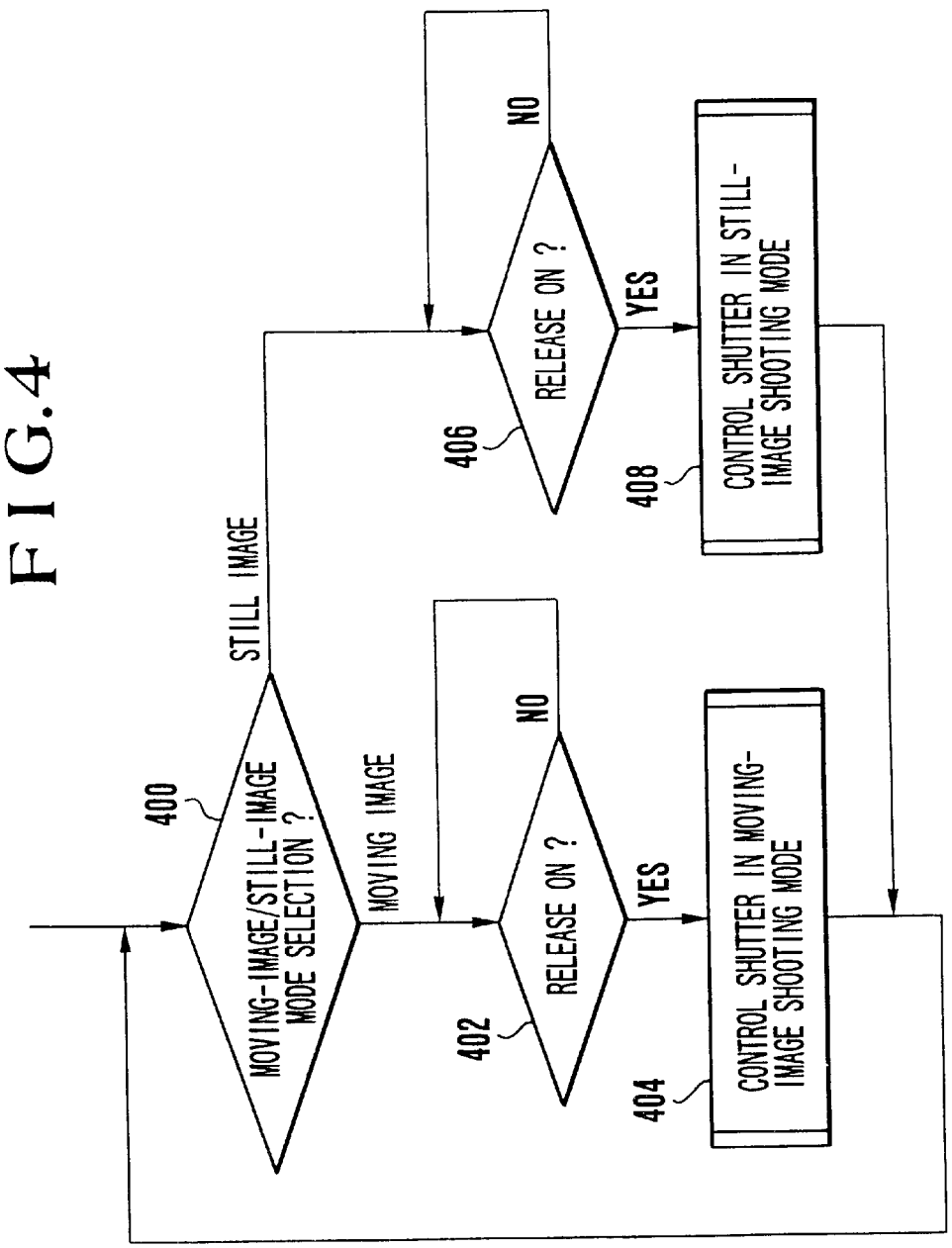
FIG. 4 is a flow chart showing the procedures for actions to be taken within a shutter control device included in the video camera shown in FIG. 3.

FIG. 3 shows the circuit arrangement of a magnetic recording apparatus according to this invention as a first embodiment thereof. FIG. 4 shows the flow of operation procedures to be taken within a shutter control device 320 shown in FIG. 3.

Referring to FIG. 3, a reference numeral 300 denotes a focusing lens group which is provided for forming an object image on an image sensor. A numeral 302 denotes a zooming lens group. The focusing and zooming lens groups 300 and 302 are arranged to be driven respectively by a focusing motor 336 and a zooming motor 332 through a focus driving circuit 334 and a zoom driving circuit 330 in accordance with the instructions of an optical system control device 322. A numeral 304 denotes a compensating lens group. A numeral 306 denotes a shutter which is arranged to be driven by a shutter driving circuit 324 according to an instruction from a shutter control device 320. A numeral 308 denotes an iris which is arranged to be operated by an aperture control circuit 326 and an IG meter 328.

An object image is formed, through the optical system 300, 302 and 304, the shutter 306 and the iris 308, on an image sensor 310. The image sensor 310 converts the object image into an electrical signal. The electrical signal passes a preamplifier 312 and a camera signal processing circuit 314 to be sent as a video signal to a moving-image recording/still-image recording change-over control circuit 315.

In the case of moving image recording, the video signal is supplied to a video signal processing circuit 3151 to be converted into a desired form of video signal before it is supplied to a recording device 3155. In the case of still image recording, the video signal is supplied from the change-over control circuit 315 to an A/D (analog-to-digital) conversion circuit 3152 to be converted into a digital signal. The digital signal thus obtained is converted into a desired form of digital signal through a rate conversion circuit 3153 and a PCM conversion circuit 3154 and is then supplied as a still image recording signal to the recording device 3155.

A moving-image shooting/still-image shooting mode selection (hereinafter referred to as M/S selection) input part 316 is arranged to supply either a moving image shooting mode selection signal or a still. image shooting mode selection signal, according to a selection made by the photographer, to both the shutter control device 320 and the moving-image recording/still-image recording change-over control circuit 315. A release device 318 is arranged to supply a release switch on/off signal (hereinafter referred to as a release signal) to the shutter control device 320 when a release button is pushed by the photographer.

The shutter control device 320 which uses a microcomputer is arranged to control the shutter speed to make it most apposite to the still image shooting or to the moving image shooting and also to control the optical system, the signal processing system and the recording device in accordance with input signals which include the above-stated M/S selection signal and the release signal. Further, the characteristics of these control actions are stored as programs in a memory within the shutter control device 320. In accordance with the selection signal from the above-stated M/S selection input part 316, the control is carried out by calling an applicable program stored.

Next, referring to FIG. 4, the flow of operation which is to be performed within the shutter control device 320 of FIG. 3 on the basis of the programs stored in the memory is described as follows:

At a step 400: A check is made for detection of the M/S selection signal of the M/S selection input part (moving-image shooting/still-image shooting mode selection input part) 316. In other words, in a case where a mode selecting operation is performed by the photographer to select the moving image shooting mode or the still image shooting mode, the mode as selected is detected from the M/S selection signal and the flow of control shifts to an applicable process.

If the moving image shooting mode is found to have been selected at the step 400, the flow comes to a step 402. At the step 402: The release signal of the release device 318 is checked for its on/off state. If the release signal is found to be on, the process of the moving image shooting is judged to have begun and the flow comes to a next step 404. At the step 404: Shutter control is actually performed in a manner suited for the moving image shooting. In a case where the still image shooting mode is found to have been selected at the step 400, the flow comes to a step 406. At the step 406: The release signal of the release device 318 is checked for its on/off state. If the release signal is found to be on, the shutter action is judged to have begun and the flow comes to a step 408. At the step 408: Shutter speed is controlled for the still image shooting, and other related control actions are also performed. Since the process of the step 408 constitutes an essential part of this invention, its details will be described later.

Upon completion of the shutter control for the moving image shooting or the still image shooting, the flow comes back to the step 400 for detection of the moving-image/still-image shooting mode selection signal.

Figure 5:
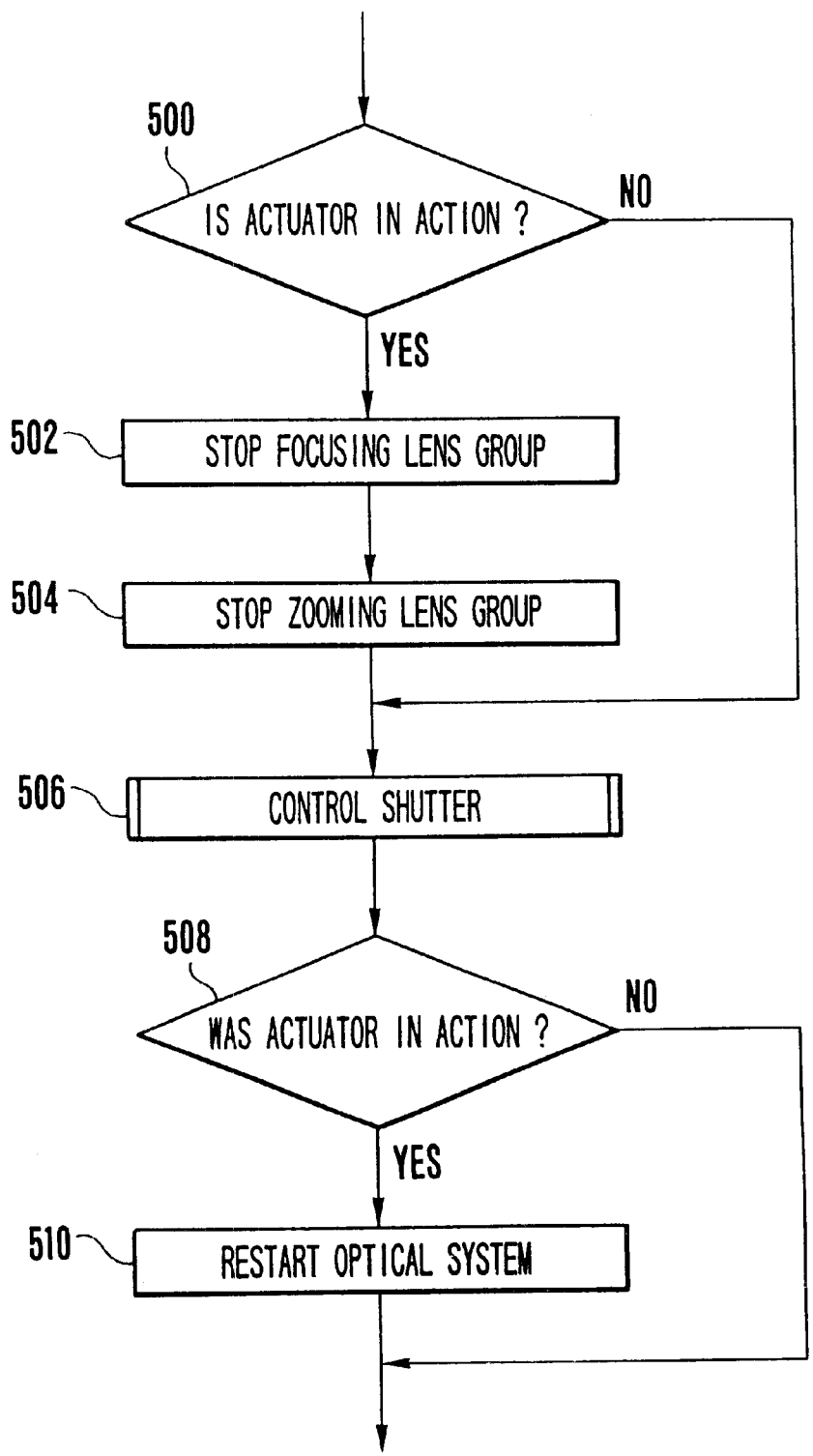
FIG. 5 is a flow chart showing the internal flow of shutter control of FIG. 4 for still image shooting.

Referring to the flow chart of FIG. 5, the details of a shutter control routine of the step 408 of FIG. 4 for the still image shooting are as follows: At a step 500: With the shutter judged to be on, a check is made to find if each of the optical system actuators is in action. If not, the flow comes to a shutter control step 506. If the actuator is judged to be in action, the flow comes to a step 502 for an actuator stopping routine, which is executed as described below:

At the step 502: If the focusing lens group 300 is moving, the lens group 300 is forcibly brought to a stop. At a next step 504: If the zooming lens group 302 is in action while the shutter is on, the zooming lens group 302 is brought to a stop. The flow then shifts from the step 504 to the shutter control step 506. At the step 506: The still image shooting is carried out by driving the shutter 306 at a predetermined shutter speed.

At a step 508: A check is made to find if the actuator was judged to be in action and forcibly brought to a stop at the step 500. If not, the flow comes out of this routine. If so, the flow comes to an optical system restarting step 510. At the step 510: After the end of the still image shooting, if the actuator is found to have been moving before it is brought to a stop, the actuator is again caused to drive the applicable lens group on the same condition as the condition under which the control over the focusing lens group 300 or the zooming lens group 302 is brought to a stop.

As described above, with the release button turned on by the photographer in the still image shooting mode, the control operation is performed to forcibly bring the focusing lens group and the zooming lens group to a stop. Therefore, conditions inapposite to shooting such as changes in the angle of view and in the extent of blur of the image picked up due to the movement of the optical system resulting from the release operation can be prevented. Further, since the optical system is movable again, after the still image shooting, under the same condition as before. Therefore, any unnatural shot that results from the forced stoppage mentioned above can be minimized. In other words, the arrangement of this embodiment prevents an image shake and enables the video camera of the kind capable of recording both a moving image and a still image to give a sharp still image shot because the optical system actuators for the focusing and zooming lens groups are forcibly brought to a stop for still image shooting.

Modification Example of Embodiment I

Figure 6:
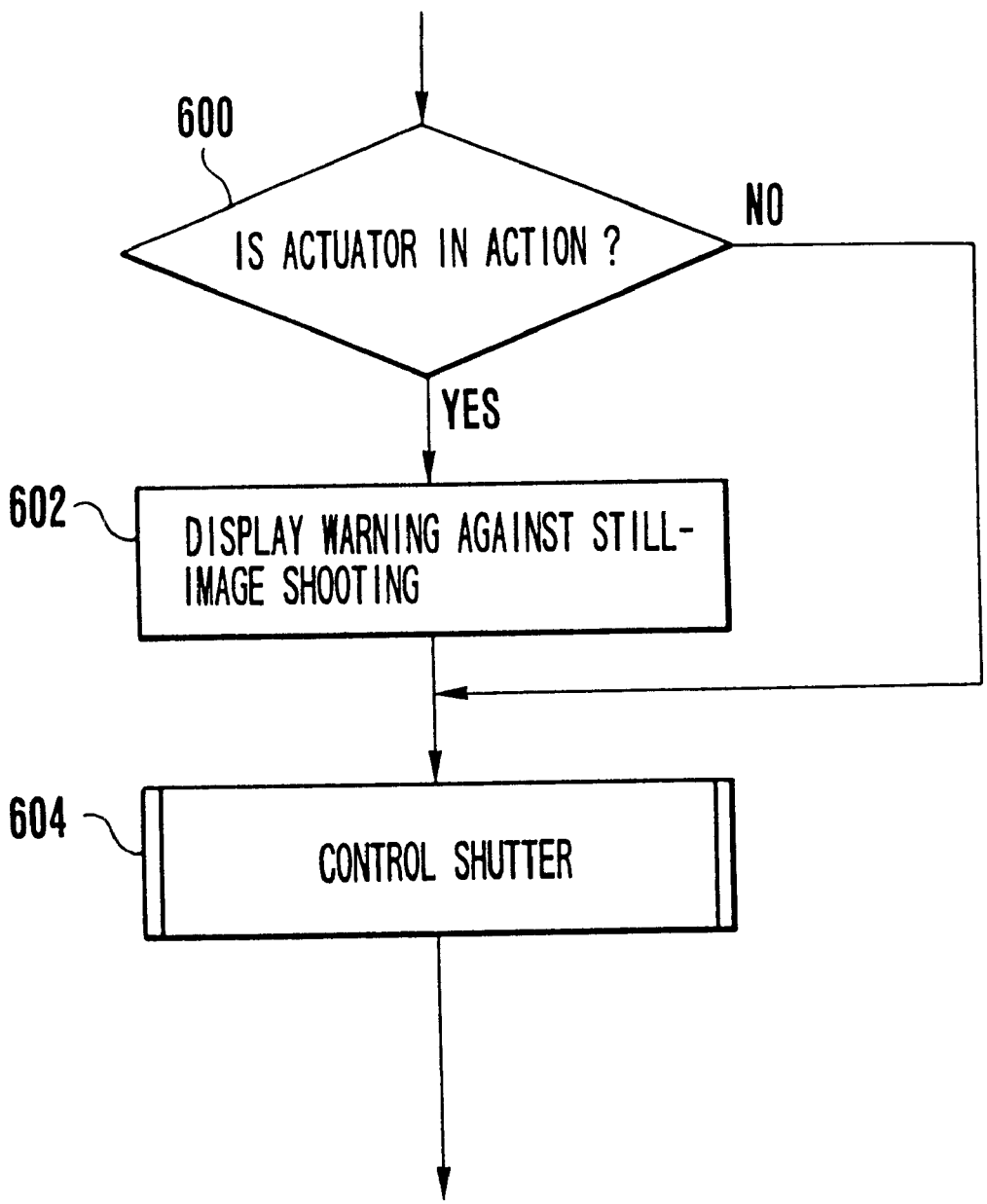
FIG. 6 is a flow chart showing the internal flow of shutter control performed for still image shooting in a manner as a modification example of the first embodiment.

In the case of the first embodiment of this invention described above, the actuators of the optical system are arranged to be brought to a stop when the release device is turned on. However, the invention is not limited to this arrangement. This arrangement may be changed, as indicated at the step 602 of FIG. 6, to attract the attention of the photographer by displaying a warning while the actuators are in action. It is also possible to arrange the iris to be brought to a stop the instant the actuators are brought to a stop.

Embodiment II

Figure 7:
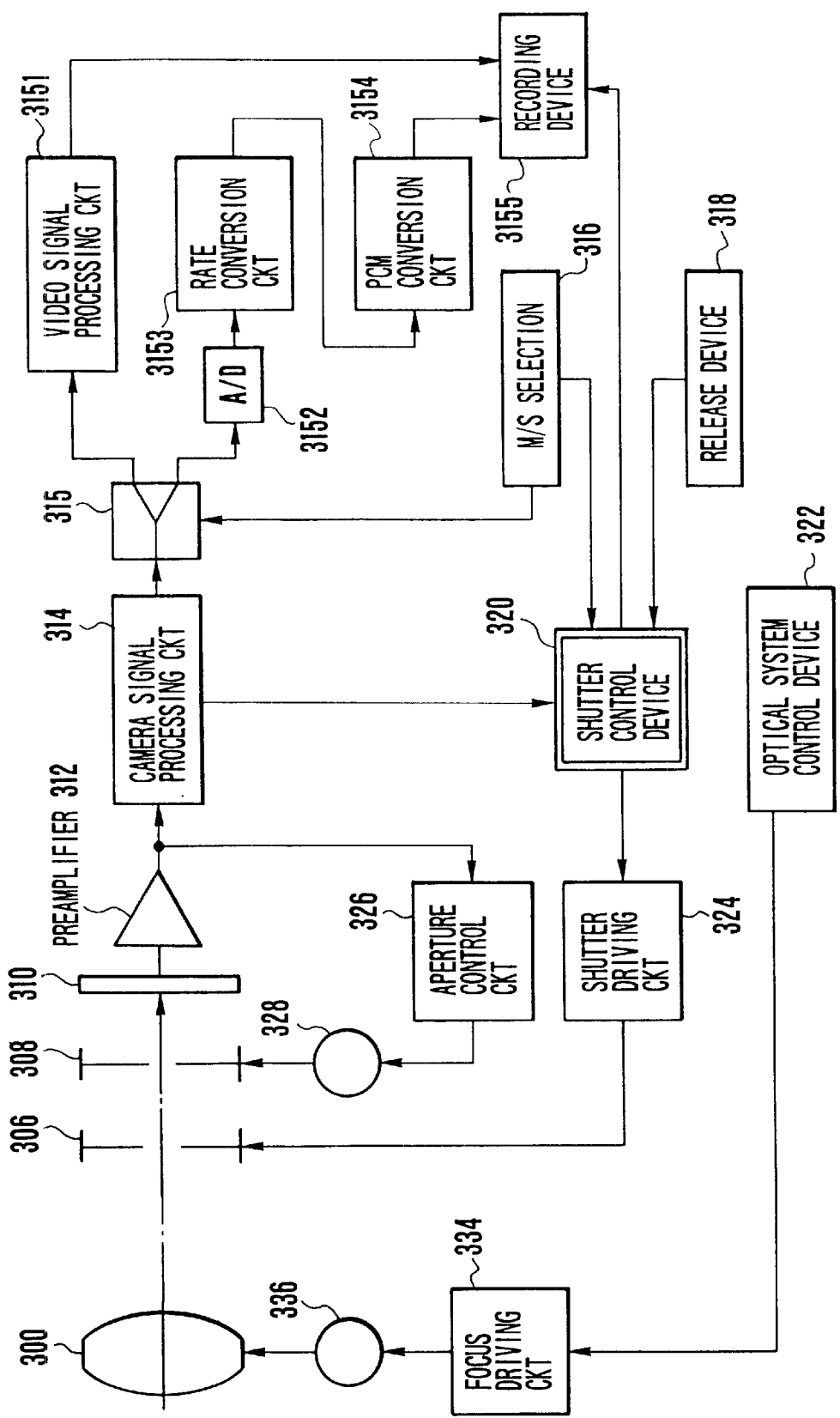
FIG. 7 is a block diagram showing the circuit arrangement of a video camera which is arranged according to this invention as a second embodiment thereof.

FIG. 7 shows the circuit arrangement of a magnetic recording apparatus which is arranged as a second embodiment of this invention. The arrangement is similar to that of the first embodiment shown in FIG. 3. However, the zooming lens group 302, the compensating lens group 304, the zoom driving circuit 330 and the motor 332 are omitted from the second embodiment. Further, in the case of the second embodiment, control signal exchange is not particularly necessary between the shutter control device 320 and the optical system control device 322. The shutter control device 320 is arranged to receive an automatic white balance (AWB) control state signal from the camera signal processing circuit 314. The AWB control state signal indicates the state of changes taking place in the AWB control. Input signals to the shutter control device 320 include a moving-image shooting/still image shooting (M/S) mode selection signal, a release signal, the AWB control state signal, etc. In accordance with the input signals, the shutter control device 320 controls the shutter and the recording device in a manner most apposite to still image shooting or to moving image shooting.

Figure 8:
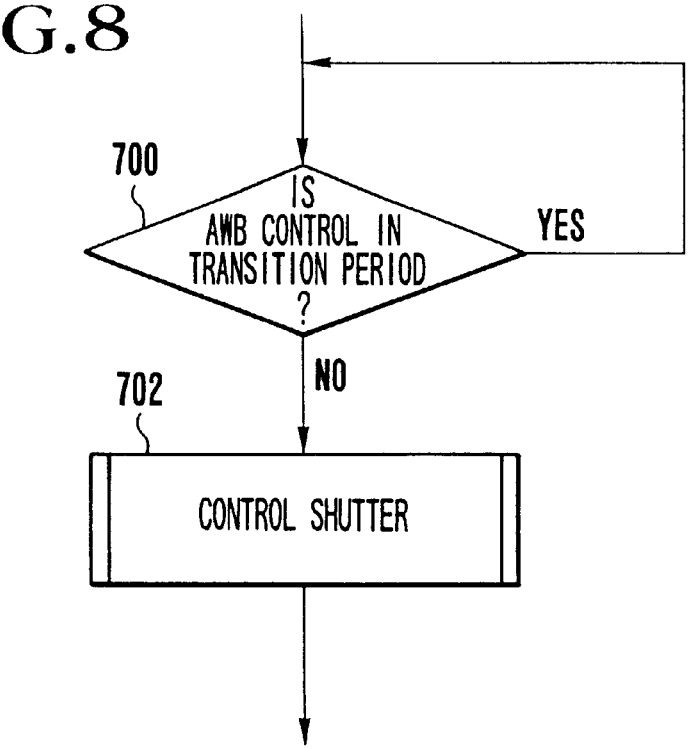
FIG. 8 is a flow chart showing procedures for shutter control to be taken at the time of still image shooting by a shutter control device shown in FIG. 7.

The flow of the operation procedures to be taken within the shutter control device 320 of FIG. 7 is similar to the flow shown in FIG. 4. However, the details of the process of the shutter control routine to be executed for still image shooting at the step 408 differ from the first embodiment. The details of this shutter control routine for still image shooting are described below with reference to FIG. 8 which is a flow chart:

At a step 700: The above-stated AWB control state signal is checked to find if the state of change taking place in the AWB control is above a given level. In other words, a check is made to find if the AWB control is in a transition period. If so, the flow of control is inhibited from coming to a next step 702 which is a shutter driving routine until the AWB control comes to an end. If the AWB control is judged to be in a normal state at the step 700, the flow comes to the step 702 for the shutter driving routine. At the step 702: When still image shooting is judged to be possible, the still image shooting is carried out by driving the shutter 306 at a predetermined shutter speed.

The second embodiment is thus arranged to monitor the AWB control state when a release button (or device) is turned on in the still image shooting mode; and to inhibit the shutter operation if the AWB control is in a transition period. Therefore, a still image can be prevented from being recorded in an inapposite state when a color on the image plane differs from the actual color of the object. In other words, with the second embodiment arranged to inhibit a release action for still image shooting according to the AWB control state, the color of the still image is effectively prevented from differing from the actual color. This arrangement enables the video camera of the kind capable of recording both moving and still images to ensure sharp still image shots.

Modification Example of Embodiment II

Figure 9:
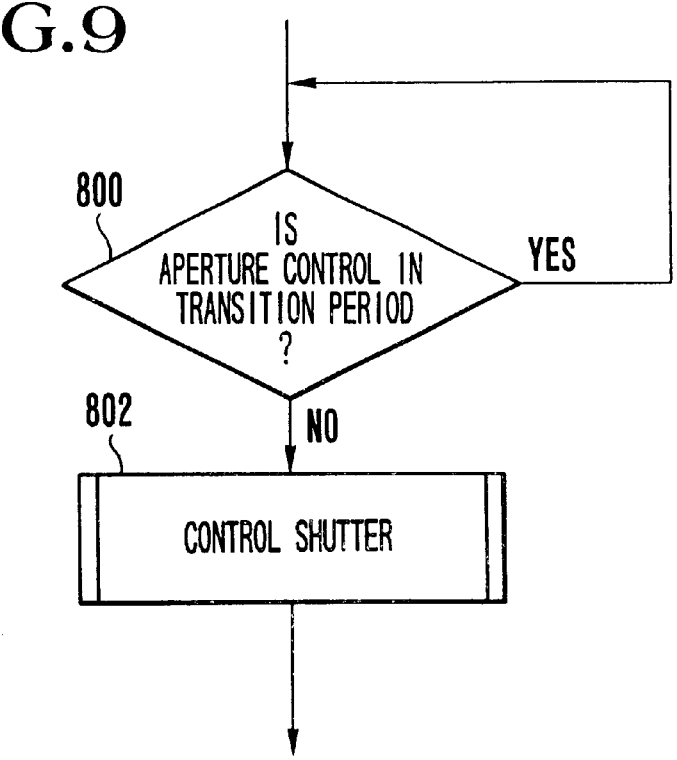
FIG. 9 is a flow chart showing the internal flow of shutter control performed for still image shooting in a manner as a modification example of the second embodiment.
Figure 10:
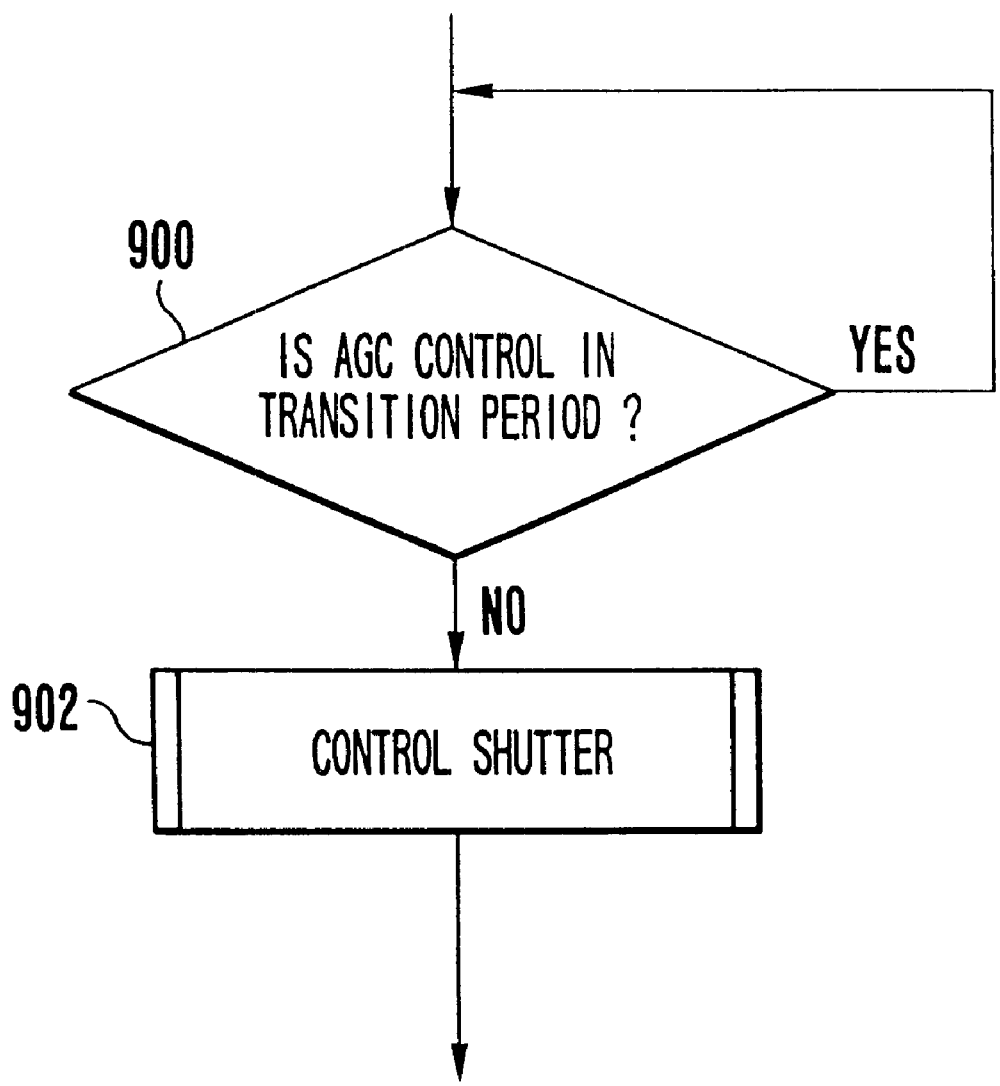
FIG. 10 is a flow chart showing the internal flow of shutter control performed for still image shooting by another modification example of the second embodiment.

The second embodiment of the invention described above is arranged to allow or inhibit the release action in accordance with the AWB control state signal. However, the invention is not limited to this arrangement. For example, this arrangement may be changed to allow or inhibit the release action according to an aperture control state signal indicating the state of aperture control as shown at a step 800 in FIG. 9 which is a flow chart. In the case of this modification, the release action is inhibited when the state of aperture control changes to more than a given extent. It is also possible to inhibit the release action when automatic gain control (AGC) changes to more than a given extent as shown at a step 900 in FIG. 10 which is also a flow chart.

Further, it is of course possible to arrange a magnetic recording apparatus by combining the first and second embodiments described in the foregoing.

The arrangement of each of the embodiments described above gives the following advantages:

(1) Since the magnetic recording apparatus of the kind capable of recording both moving and still images is arranged to forcibly inhibit the actuators of the optical system from performing their driving actions upon detection of the on-state of the release device in the still image recording mode, an image shake can be prevented to ensure a sharp still image shot.

(2) The magnetic recording apparatus of the kind capable of recording both moving and still images is arranged to monitor the operating state of camera control at the time of still image shooting and to inhibit the release action when the state of camera control is found to be in a transition period. Therefore, still images can be prevented from being recorded under a condition inapposite to still image shooting.

The following describes in detail further embodiments of this invention:

Embodiment III

Figure 11:
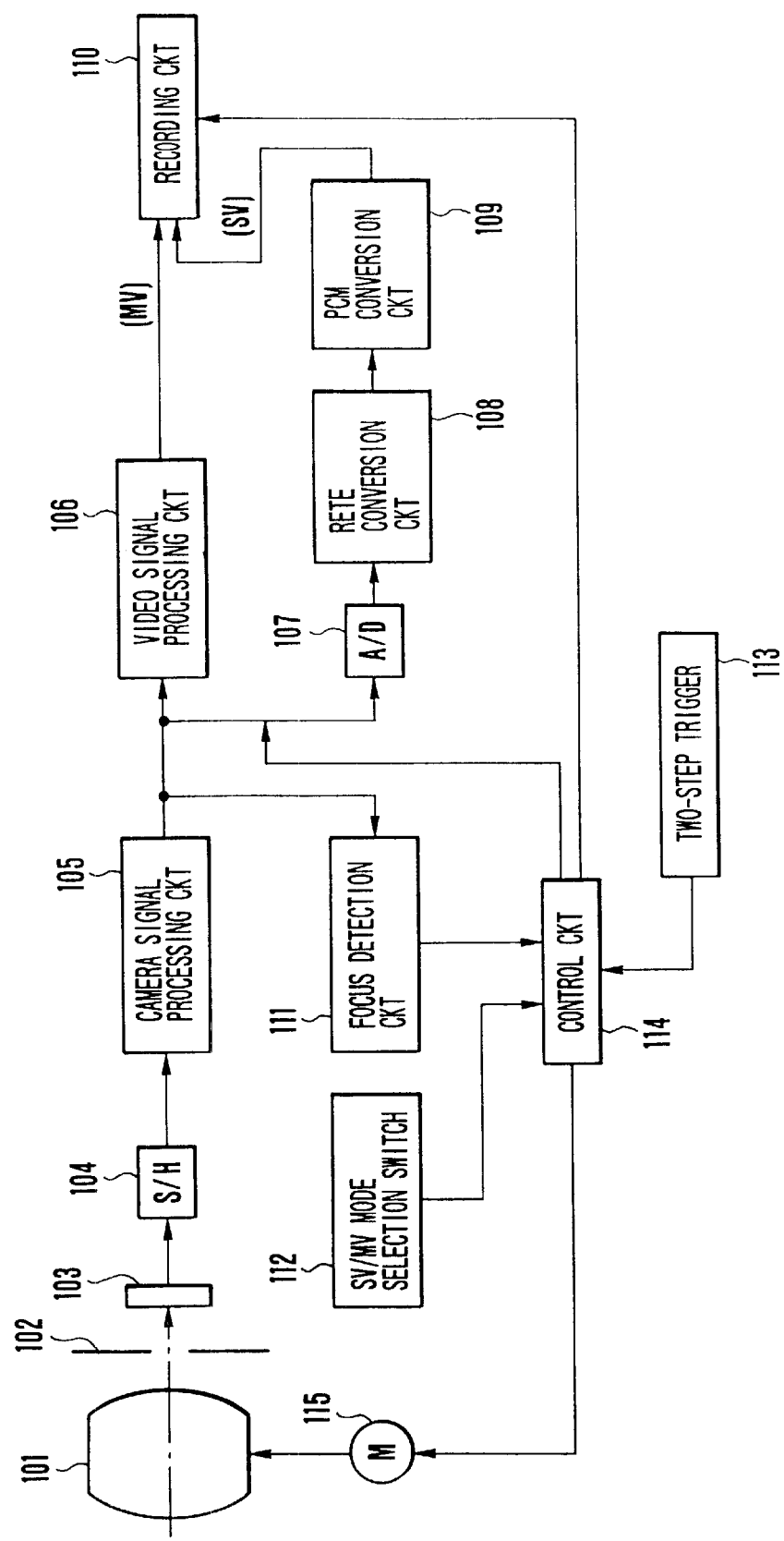
FIG. 11 is a block diagram showing the whole arrangement of a third embodiment of this invention.

FIG. 11 is a block diagram showing the overall arrangement of a third embodiment of this invention. The hardware arrangement shown in FIG. 11 and described in the following applies not only to the third embodiment but also applies in common to other embodiments which will be described after the third embodiment.

Referring to FIG. 11, a photo-taking lens system 101 includes a focusing lens which is provided for adjustment of focus. An iris 102 is arranged to control the quantity of incident light. An image sensor 103 is made of a CCD or the like and is arranged to photoelectrically convert into an image signal an object image formed on its image pickup plane by the focusing lens 101.

The illustration further includes a sample-and-hold (S/H) circuit 104; a camera signal processing circuit 105 which is arranged to convert the output of the S/H circuit 104 into a TV signal; a video signal processing circuit 106 which is arranged to output a moving-image recording (hereinafter referred to as MV) signal; an A/D conversion circuit 107 which converts the TV signal into a digital TV signal; a rate conversion circuit 108 which is arranged to compress the digital TV signal; a PCM conversion circuit 109 which is arranged to output a still image recording (hereinafter referred to as SV) signal which has been PCM-converted; and a recording circuit 110.

A focus detection circuit 111 is arranged to detect the focused state of an object, for example, by extracting a high-frequency component from the video signal outputted from the camera signal processing circuit 105. An SV/MV mode selection switch 112 is arranged to set the recording mode of the apparatus either in an SV (still image recording) or an MV (moving image recording) mode. A two-step type trigger switch 113 (hereinafter referred to simply as the trigger) is arranged to give an instruction to allow or inhibit an automatic focusing (hereinafter referred to as AF) action and also to give an instruction for recording.

A control circuit 114 is arranged to output an instruction for focus control according to the output of the focus detection circuit 111; to designate the recording mode according to the output of the SV/MV mode selection switch 112; and to control and allow or inhibit the execution of recording and the AF action according to the output of the trigger 113 (indicating an open state, a half-pushed state or a fully-pushed state of the trigger 113). A driving motor 115 is arranged to carry out the focus control instructions given from the control circuit 114 as to the rotating direction, rotating speed, rotation and stop of the focusing lens 101.

Figure 12:
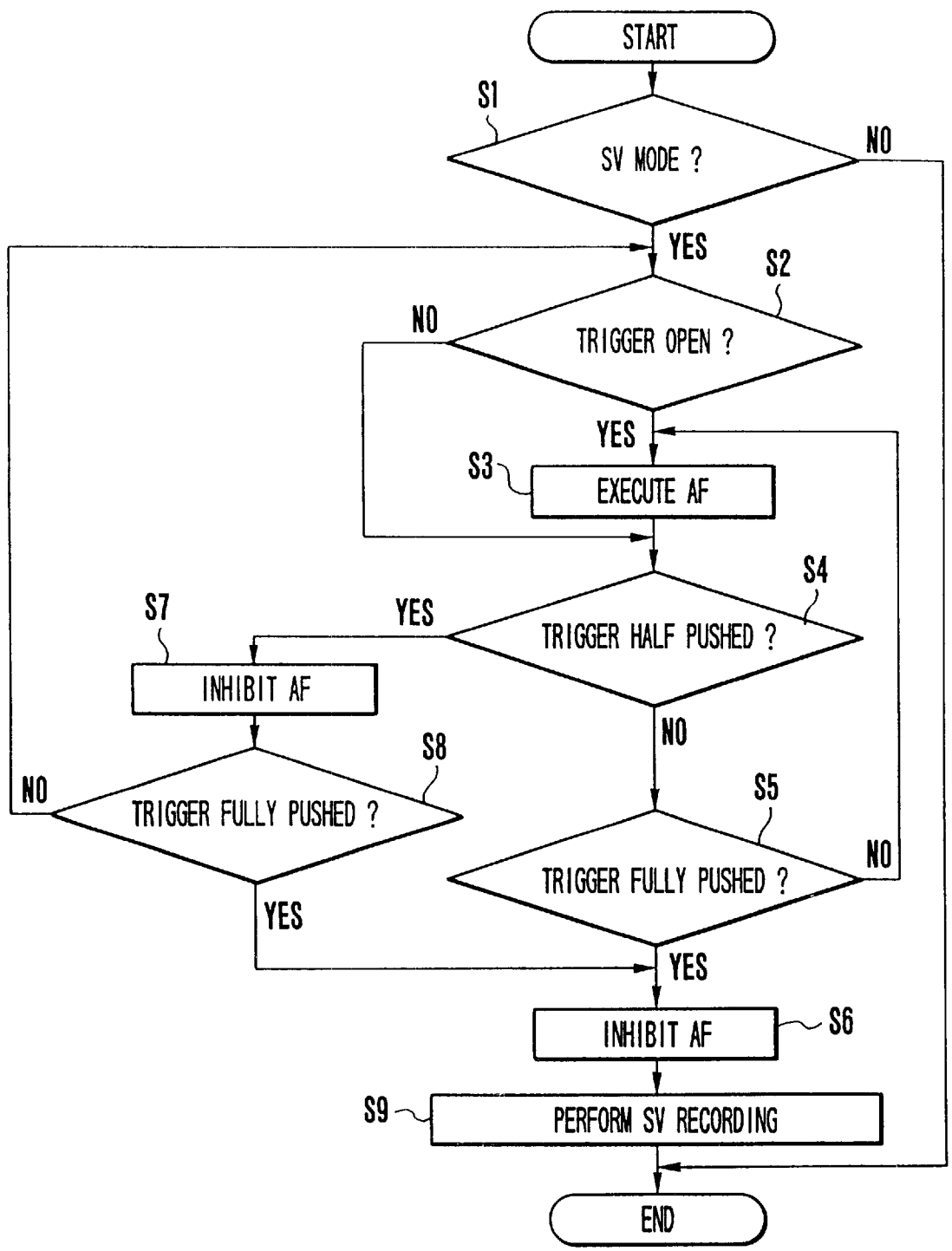
FIG. 12 is a flow chart showing the procedures of control to be taken in the still image recording (SV) mode of the third embodiment.

FIG. 12 is a flow chart showing the flow of control to be performed in the SV mode. At a step S1: The recording mode is checked for the SV mode. If it is found to be the SV mode, the flow comes to a step S2. At the step S2: A check is made to find if the trigger is open. If so, the flow comes to a step S3 to have the AF action performed before the flow comes to a step S4. If not, the flow directly comes to a step S4. At the step S4: A check is made to find if the trigger is in a half-pushed state. If not, the flow comes to a step S5. At the step S5: A check is made to find if the trigger is in a fully-pushed state. In the case of the fully-pushed state, the flow comes to a step S6 to inhibit the AF action. At a step S9: The object image formed on the image pickup plane is taken in. A signal thus obtained from the image sensor 103 is subjected to the above-stated processes including the A/D conversion, the rate conversion and the PCM conversion. After completion of these processes, a still image is recorded.

If the trigger is found not in the fully-pushed state at the step S5, the flow comes back to the step S3 to allow the AF action to be performed. In this instance, the trigger is in its open state. If the trigger is found to be in the half-pushed state at the step S4, the flow comes to a step S7 to inhibit the AF action. The flow then comes to a step S8. At the step S8: A check is made to find if the trigger is in the fully-pushed state. If not, the flow comes back to the step S2 to find if the trigger is open. If the trigger is found to be in the fully-pushed state at the step S8, the flow comes to the step S6 to inhibit the AF action. After that, the flow comes to the step S9 to take in the object image formed on the image pickup plane and to have a still image recorded in the same manner as mentioned above.

Figure 13:
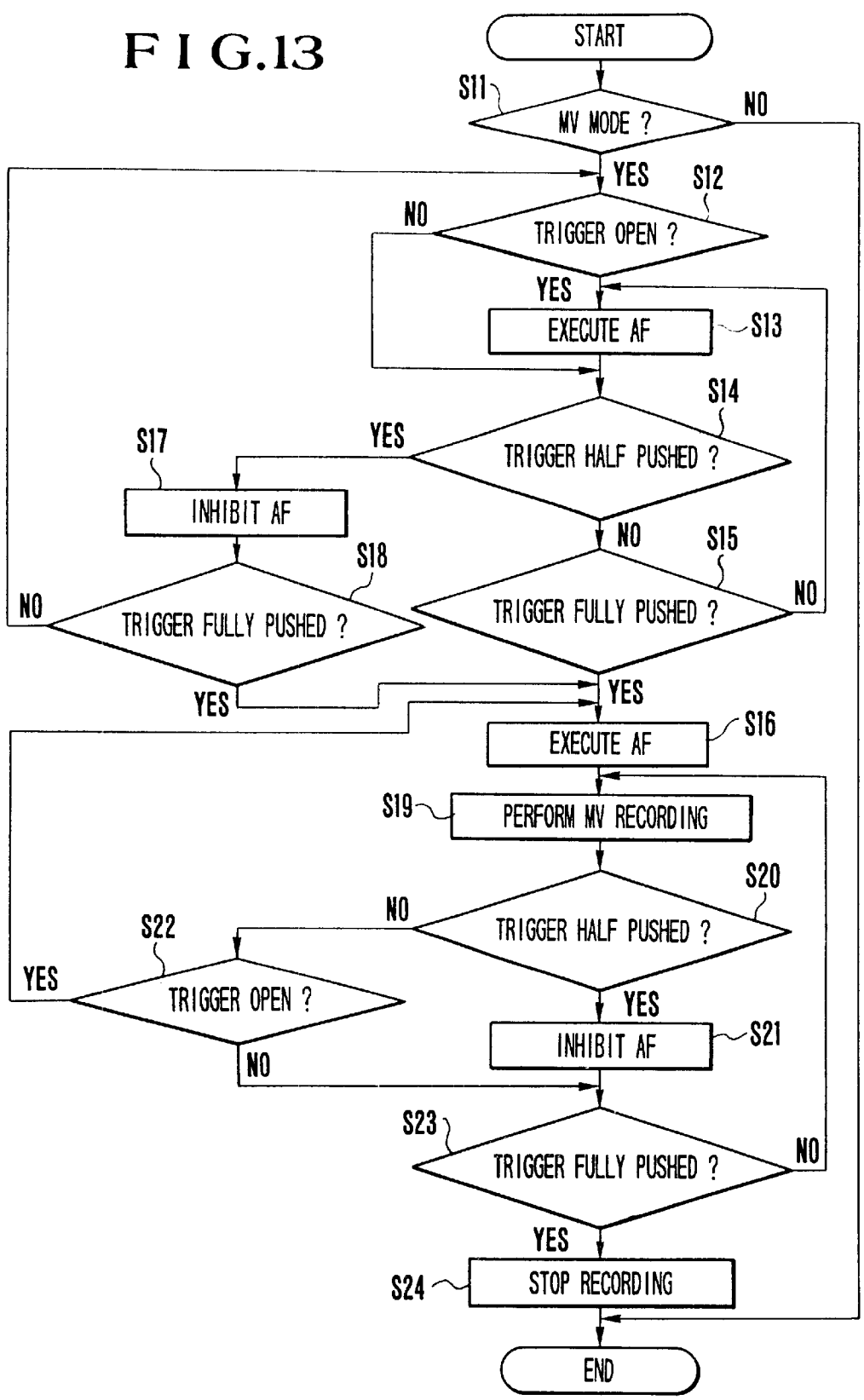
FIG. 13 is a flow chart showing the procedures of control to be taken in the moving image recording (MV) mode of the third embodiment.

FIG. 13 is a flow chart showing the flow of control procedures to be taken when the recording mode is the MV mode. At a step S11: A check is made to find if the recording mode is the MV mode. If so, the flow comes to a step S12. At the step S12: The trigger is checked to find if it is open. If so, the flow comes to a step S13 to allow the AF action to be carried out. If not, the flow comes to a step S14. At the step S14: A check is made to find if the trigger is in the half-pushed state. If not, the flow comes to a step S15. At the step S15: A check is made to find if the trigger is in the fully-pushed state. If so, the flow comes to a step S16 to allow the AF action to be carried out. After that, the flow comes to a step S19 to have the object image on the image pickup plane subjected to the above-stated video signal processing action before the moving image thus obtained is recorded.

If the trigger is found to be not in the fully-pushed state at the step S15, the flow comes back to the step, S13 to allow the AF action to be carried out. The trigger is in the open state in this instance. At the step S14: A check is made to find if the trigger is in the half-pushed state. If so, the flow comes to a step S17 to inhibit the AF action. At a step S18: A check is made to find if the trigger is in the fully-pushed state. If not, the flow comes back to the step S12 to find if the trigger is open.

In a case where the trigger is found to be in the fully-pushed state at the step S18, the flow comes to the step S16 to allow the AF action to be carried out. The flow then comes to the step S19 to have the object image on the image pickup plane recorded in the moving image recording mode. During the process of recording, the flow comes to a step S20. At the step S20: A check is made to find if the trigger is in the half-pushed state. If so, the flow comes to a step S21 to inhibit the AF action. If not, the flow comes to a step S22. At the step S22: A check is made to find if the trigger is open. If so, the flow comes back to the step S16 to allow the AF action to be carried out and then comes to the step S19 to perform the moving image recording. If not, the flow comes to a step S23. At the step S23: A check is made again to find if the trigger has been fully pushed. If not, the recording is allowed to continue. If the trigger is found to have been fully pushed, the flow comes to a step S24 to bring the recording to a stop.

Figure 14:
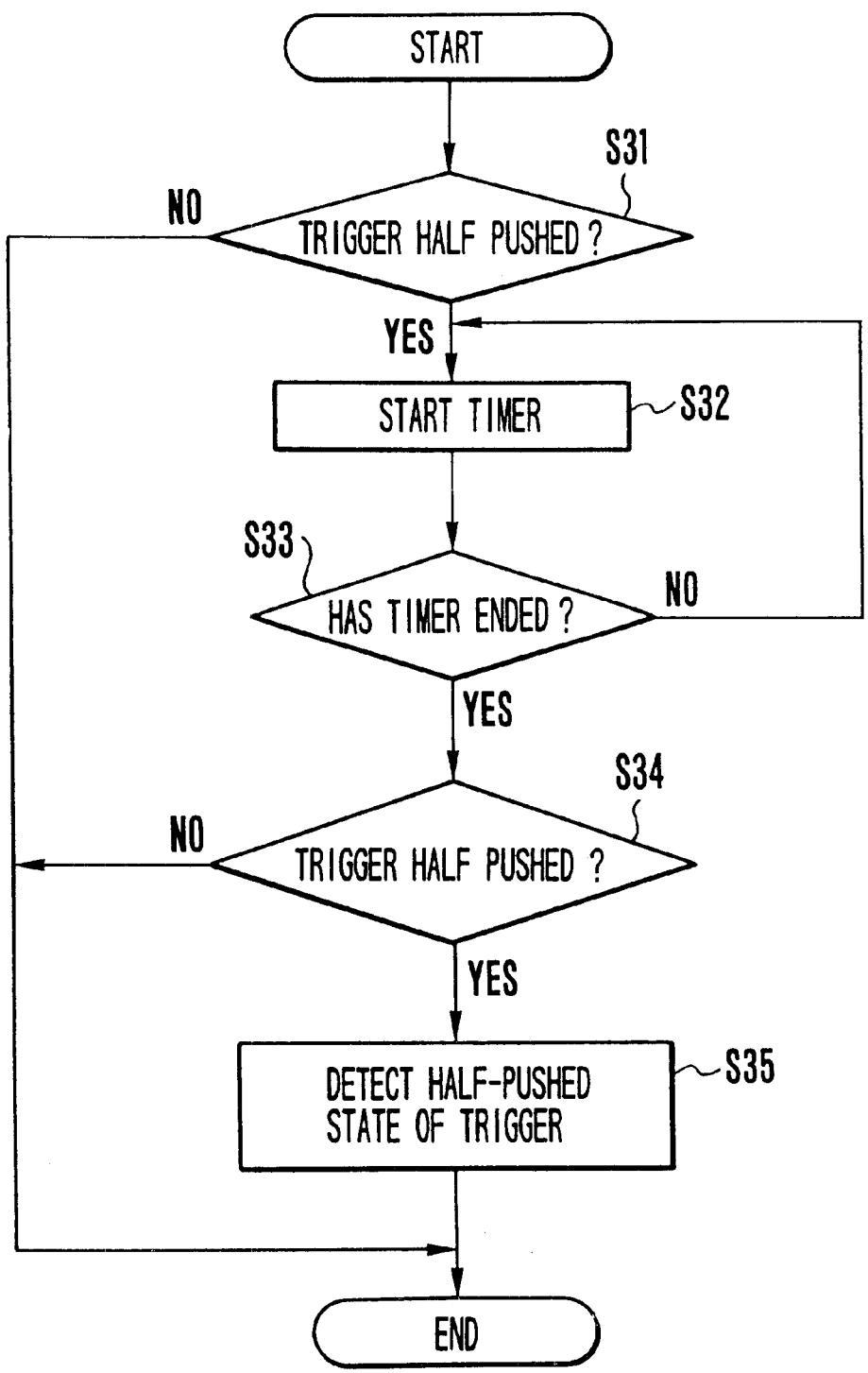
FIG. 14 is a flow chart showing procedures for detecting a half-pushed state of a 2-step trigger switch.

FIG. 14 is a flow chart showing the flow of control procedures for detecting the half-pushed state of the trigger while preventing chattering. The states of the trigger other than the half-pushed state can be detected by procedures similar to this flow of control. Referring to FIG. 14, a check is made at a step S31 to find if the trigger is in the half-pushed state. If so, the flow comes to a step S32 to start a timer. At a step S33: The length of time is counted until the time count of the timer comes to an end. The sensitivity of reading the half-pushed state of the trigger is determined by the time thus measured. The time length set for the SV mode differs from the the time length set for the MV mode. For example, in the event of the SV mode, the time is set to be shorter than for the MV mode to read the half-pushed state of the trigger with a higher sensitivity. In the MV mode, the time may be set to be longer by taking into consideration the possibility of pushing the trigger from its open state directly to the fully-pushed state for recording. The length of time count thus can be variously set according to the mode and the control function.

Upon completion of the count of the timer at the step S33, the flow comes to a step S34. At the step S34: If the trigger is found to be still in the half-pushed state even after the lapse of the time set at the timer, the flow comes to a step S35. At the step S35: The half-pushed state of the trigger is detected.

Embodiment IV

In the SV mode, it is not always necessary to carry out the AF action when the two-step trigger is open and to inhibit the AF action with the trigger in the half-pushed state like in the case of the third embodiment.

Figure 15:
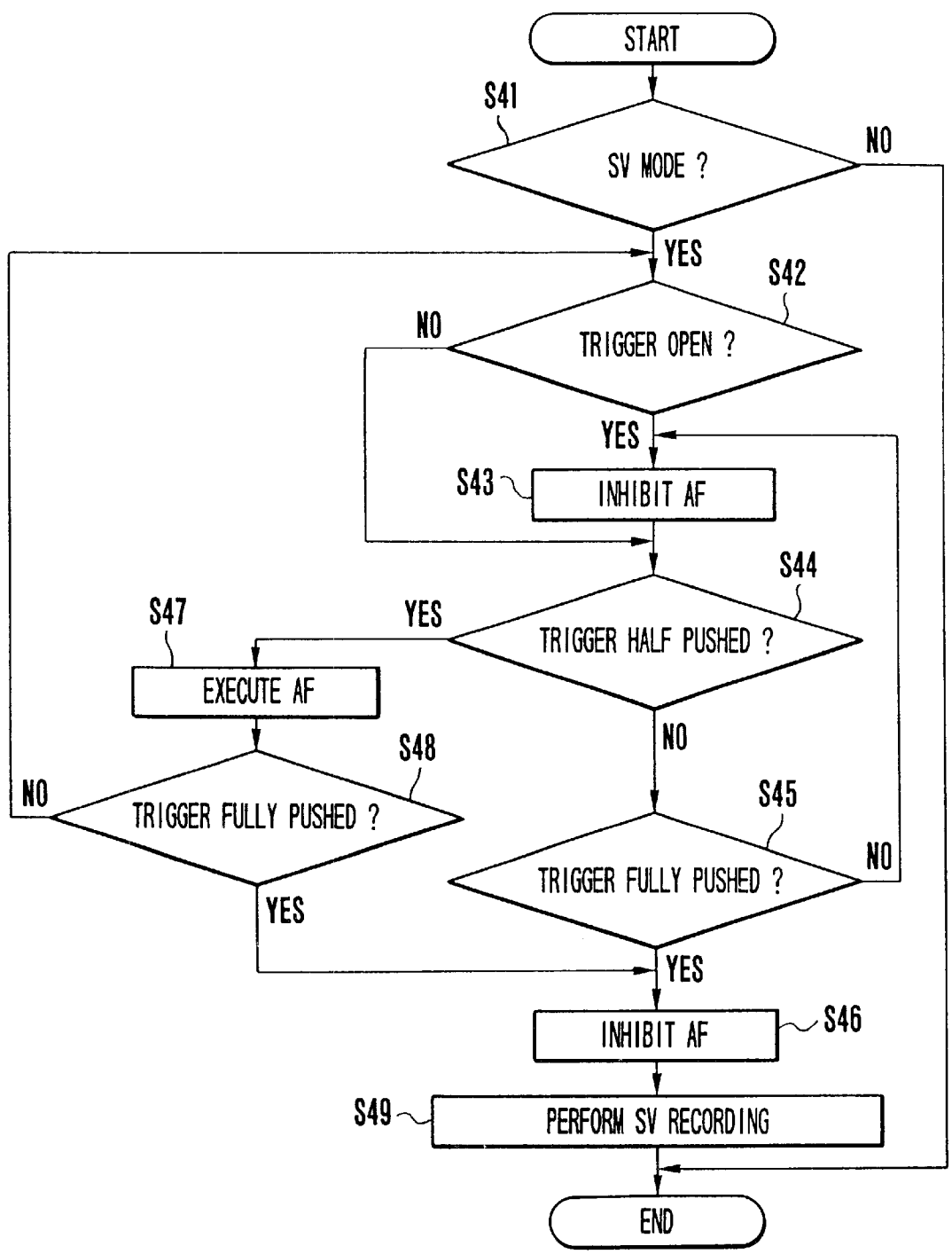
FIG. 15 is a flow chart showing the operation of a fourth embodiment of this invention.

Therefore, a fourth embodiment is arranged to inhibit the AF action when the two-step trigger is open and to carry out the AF action when the trigger is in the half-pushed state as shown in FIG. 15, which is a flow chart. Referring to FIG. 15, the fourth embodiment is described as follows: At a step S41: A check is made for the recording mode. If the recording mode is the SV mode, the flow comes to a step S42. At the step S42: The trigger is checked to see if it is open. If so, the flow comes to a step S43 to inhibit the AF action. If not, the flow comes to a step S44 to see if the trigger is in the half-pushed state. If the trigger is not in the half-pushed state, the flow comes to a step S45. At the step S45: A check is made to see if the trigger is in the fully-pushed state. If so, the flow comes to a step S46 to inhibit the AF action. The flow then comes to a step S49. At the step S49: An object image on the image pickup plane is taken in. Still image recording is carried out after the processes of the A/D conversion, rate conversion and PCM conversion are performed as described in the foregoing. If the trigger is found not in the fully-pushed state at the step S45, the flow comes back to the step S43 to inhibit the AF action. In this instance, the trigger is in its open state. If the trigger is found to be in the half-pushed state at the step S44, the flow comes to a step S47 to carry out the AF action. The flow then comes to a step S48. At the step S48: A check is made to find if the trigger is in the fully-pushed state. If not, the flow comes back to the step S42 to find if the trigger is open. If the trigger is found to be in the fully-pushed state at the step S48, the flow comes to the step S46 to inhibit the AF action. The flow then comes to the step S49 to take in the object image formed on the image pickup plane for still image recording.

Embodiment V

If the recording mode is the MV mode, it is possible to allow or inhibit the AF action according to the state of the AF action performed up to that point of time (the open or half-pushed state of the trigger) in performing recording with the trigger fully pushed.

Figure 16:
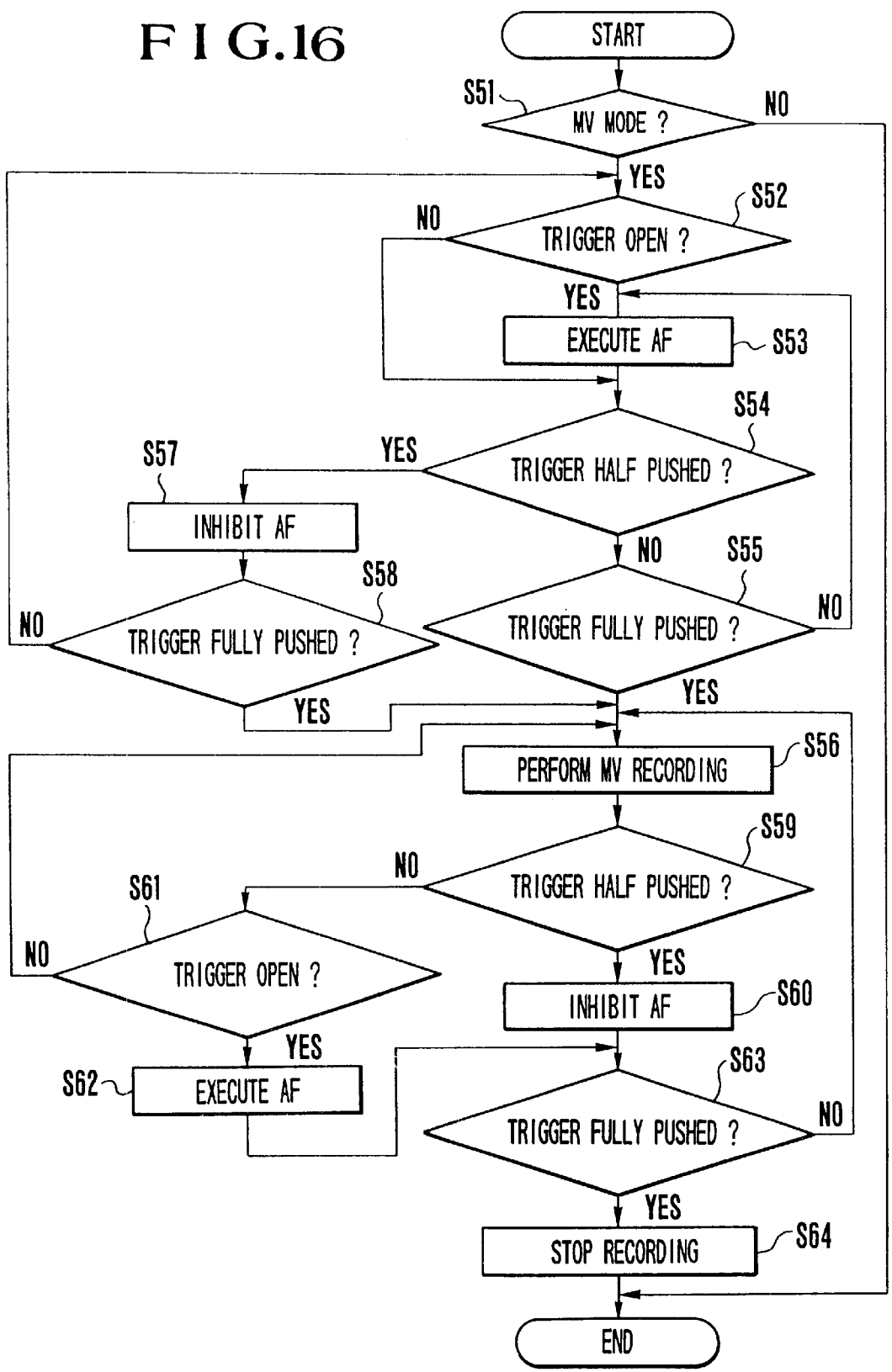
FIG. 16 is a flow chart showing the operation of a fifth embodiment of this invention.

Therefore, a fifth embodiment is arranged as shown in FIG. 16 which is a flow chart. Referring to FIG. 16, the recording mode is first checked at a step S51 to find if it is the MV mode. If so, the flow comes to a step S52 to find if the trigger is open. If so, the flow comes to a step S53 to allow the AF action to be carried out. If not, the flow comes to a step S54 to find if the trigger is in the half-pushed state. If the trigger is found not in the half-pushed state, the flow comes to a step S55. At the step S55: A check is made to find if the trigger is in the fully-pushed state. If so, the flow comes to a step S56 to have the moving image recording performed. If not, the flow comes back to the step S53 to allow the AF action to be carried out. At this time, the trigger is open.

If the trigger is found to be in the half-pushed state at the step S54, the flow comes to a step S57 to inhibit the AF action. The flow then comes to a step S58 to find if the trigger is in the fully-pushed state. If not, the flow comes back to the step S52 to find if the trigger is open. If the trigger is found to be in the fully-pushed state at the step S58, the flow comes to the step S56 to have the moving image recording performed with the AF action left inhibited.

During the process of recording, the flow comes to a step S59. At the step S59: A check is made to find if the trigger is in the half-pushed state. If so, the flow comes to a step S60 to inhibit the AF action. If not, the flow comes to a step S61. At the step S61: A check is made to find if the trigger is open. If not, the flow comes back to the step S56 to perform the moving image recording. If so, the flow comes to a step S62 to allow the AF action to be carried out. The flow then comes to a step S63. At the step S63: A check is made to find again if the trigger is in the fully-pushed state. If not, the recording is allowed to continue. If so, the flow comes to a step S64 to bring the recording to a stop.

Embodiment VI

The two-step trigger may be arranged to have no function in its half-pushed state, that is, to act as a one-step trigger switch, when the MV mode is selected for recording. In the case of a sixth embodiment of this invention, the trigger is arranged to be opened and fully pushed for recording without having the function of allowing or inhibiting the AF action.

The third to sixth embodiments described above are arranged to give instructions for allowing/inhibiting the AF action and for recording by means of one operation means. Therefore, the operability of the apparatus for recording and allowing/inhibiting the AF action can be greatly enhanced to widen shooting conditions. Further, the embodiments permit the intention of the photographer to be more easily reflected in the images recorded.

Next, other embodiments which are arranged with attention given to white balance control are described.

As mentioned in the foregoing, the control actions which must have different characteristics for still image shooting from characteristics for moving image shooting include the white balance control action.

In shooting a still image, the image of the object to be shot is instantly frozen. In order to secure a shutter opportunity, a white balance correcting action is desired to be quickly performed without any error.

On the other hand, in the case of moving image shooting, the images of the object are temporally continuing. In this case, although the white balance correction is also preferably performed within a short period of time, an excessively high-speed white balance correction tends to cause an overshot correction. The overshooting then might result in a repetitive correction, which causes the continuous images to give a disagreeable impression. In view of this, for the moving image shooting, the white balance correction is desired to be performed smoothly rather than at a high speed.

Therefore, if the white balance correction or adjustment is controlled in the same manner for both the moving image shooting and the still image shooting, color adjustment cannot be adequately accomplished for each of the different modes of shooting.

In view of this problem, each of the embodiments described below is arranged to enable an image pickup apparatus to accomplish white balance control appositely to the characteristic of still image shooting and that of moving image shooting.

The arrangement of each of these embodiments is summarized as follows: An image pickup apparatus of the kind capable of performing both moving image shooting and still image shooting comprises: gain control means for controlling an amplification gain of a color signal obtained from an image sensor; color detecting means for detecting a color of an object on the basis of a signal obtained from the gain control means; gain control signal forming means for forming a gain control signal to be supplied to the gain control means according to an output signal of the color detecting means; mode detecting means for detecting that the apparatus is set in a still image shorting mode; and control means arranged to vary a mode of control over the gain control signal forming means in response to an output of the mode detecting means.

At the time of still image shooting, this arrangement enables the apparatus to accomplish a white balance correcting action at a high speed by detecting the selection of the still image shooting mode and by increasing the amount of correction of the white balance correcting action by the gain control means. The details of these embodiments are described as follows:

Embodiment VII

Figure 17:
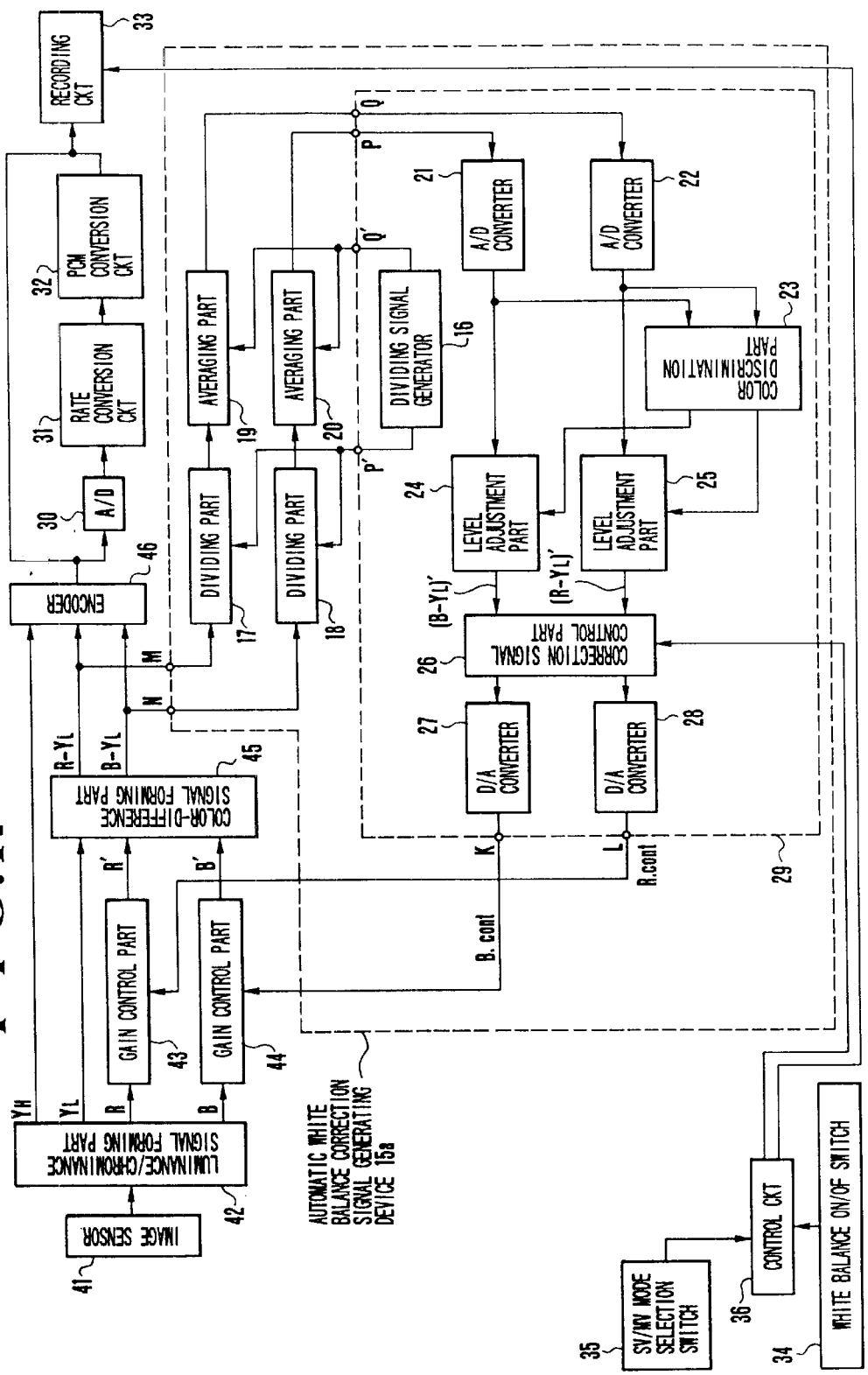
FIG. 17 is a block diagram showing the arrangement of a seventh embodiment of this invention.

FIG. 17 is a block diagram showing a seventh embodiment of this invention. The illustration includes an A/D conversion circuit 30; a rate conversion circuit 31; a PCM conversion circuit 32; a recording circuit 33; a white balance adjustment on/off switch 34; a shooting mode selection switch 35 for selection of either a moving image recording (MV) mode or a still image recording (SV) mode; and a control circuit 36. The control circuit 36 is arranged to detect the shooting mode; to cause the recording circuit 33 to perform recording in the detected mode; and to cause a white balance correcting action to be performed if the white balance on/off switch 34 is on.

The illustration further includes an image sensor 41; a luminance/chrominance signal forming part 42; a gain control part 43 for a red (R) signal; a gain control part 44 for a blue (B) signal; a color-difference signal forming part 45; and an encoder 46.

A dividing signal generator 16 is arranged to generate a dividing signal for dividing color-difference signals. The dividing signal generator 16 outputs, from a terminal P for every vertical scanning period V, a pulse for taking out a portion of each color-difference signal obtained from within the image plane. The dividing signal generator 16 also outputs a reset pulse from a terminal Q' at the end of every vertical scanning period V. Dividing parts 17 and 18 are arranged to divide respectively the color-difference signals R-YL and B-YL by outputting dividing pulses from a terminal P' for operating an analog switch or the like.

An averaging part 19 is arranged to average the divided R-YL signals. An averaging part 20 is arranged to average the divided B-YL signals. The averaged signals are inputted to a microcomputer 29 through terminals P and Q.

An A/D (analog-to-digital) converter 21 is arranged to convert the averaged B-YL signal coming from the terminal P into a digital value. An A/D converter 22 is arranged to convert the averaged R-YL signal coming from the terminal Q into a digital value. A color discrimination part 23 is arranged to discriminate the colors of the divided parts on the basis of the output values of the A/D converters 21 and 22, and to control level adjustment parts 24 and 25 according to information obtained as a result of the discrimination.

The level adjustment part 24 is arranged to adjust the value obtained from the A/D converter 21 according to a signal from the color discrimination part 23. The level adjustment part 25 is arranged to adjust the value obtained from the A/D converter 22 according to the signal from the color discrimination part 23. A correction signal control part 26 is arranged to control a white balance correction output on the basis of the outputs (R-YL)' and (B-YL)' of the level adjustment parts 24 and 25. A D/A (digital-to-analog) converter 27 is arranged to convert the output value of the correction signal control part 26 from a digital value to an analog value and to output a white balance correction signal B. cont. A D/A converter 28 is likewise arranged to convert the output of the correction signal control part 26 and to output a white balance correction signal R. cont.

Figures 20, 21:
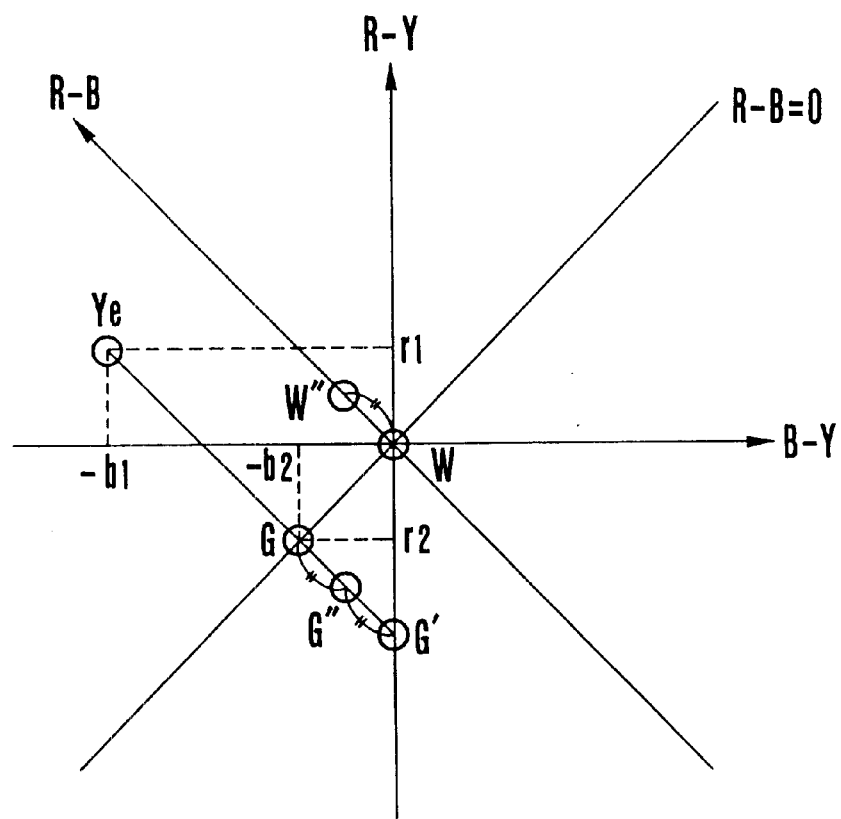
FIG. 20 shows the image-plane dividing arrangement of color detecting means shown in FIG. 17.
FIG. 21 is a vector diagram showing the operation of the arrangement shown in FIG. 17.

In FIG. 17, the circuit elements 16 to 23 constitute color detection means for detecting the color of the object. Next, the image plane dividing action of the color detection means is described as follows:

In a case where the image plane is to be divided into 20 blocks as shown in FIG. 20, the image plane is divided in the order of numbers indicated in FIG. 20. The averaging parts 19 and 20 are arranged to average the color-difference signals of the divided blocks, to amplify the average color-difference signals and to supply them as data to the microcomputer 29. When the data is taken in by the A/D converters 21 and 22 of the microcomputer 29, the dividing signal generator 16 outputs a reset pulse to reset the contents of the averaging parts 19 and 20.

The above-stated actions are performed for every field and the data of each division (block) of the image plane is supplied to the microcomputer 29 for every field. The microcomputer 29 performs a white balance correcting action on the basis of the divided data.

The color discrimination part 23 shown in FIG. 17 acts as follows: The data of the A/D-converted color-difference signals R-YL and B-YL is inputted to the color discrimination part 23. The values of the input data are compared respectively with reference values Rref and Bref which indicate the white levels preset within the color discrimination part 23 for the color-difference signals R-YL and B-YL. The color discrimination part 23 then judges what kind of color is existing in each of the divided blocks on the basis of the result of comparison. For the sake of simplification, each of the reference values Rref and Bref is assumed to be 0. The values of R-YL and B-YL data of a certain block are assumed to be r1 and −b1, for example. If these values are in the relation of r1<b1 and r1>0, the vectorial position of the color of this block is considered to be at a point Ye as shown in FIG. 21. In this instance, such signals that are for multiplying the color-difference signal B-YL by x to make it into −b2 and the color-difference signal R-YL by y to make it into −r2 are supplied respectively to the level adjustment parts 24 and 25.

Referring to FIG. 21 which is a vectorial representation, with the above-stated action performed, the signal at the point Ye is converted into a signal of a point G before it is supplied to the correction signal control part 26. At the correction signal control part 26, gain control signals are generated according to the input signals and the white level reference values Rref and Bref. The gain control signals are supplied through the D/A converters 27 and 28 to the gain control parts 43 and 44 for a white balance correcting action.

As described above, in the case of this embodiment, the circuit elements 24 to 28 constitute signal forming means for the gain control to be performed by the gain control parts 43 and 44. The signal located at the point Ye of the vectorial representation of FIG. 21 is converted into the signal located at the point G before it is inputted to the correction signal control part 26. At the correction signal control part 26, gain control signals are generated on the basis of the input signals and the white level reference values Rref and Bref. The white balance correcting action is performed by supplying the gain control signals to the gain control parts 43 and 44 through the D/A converters 27 and 28.

In this instance, the control circuit 36 is arranged as follows: In a case where the output of the mode selection switch 35 indicates the moving image shooting mode, the control circuit 36 causes the correction gain of the correction signal control part 26 to be set at a low value in such a way as to have the correction value output little by little until an apposite white level is attained, so that the white balance correcting action can be smoothly accomplished. In the event of the still image shooting mode, the correction gain of the correction signal control part 26 is caused to be set at a high value in such a way as to make correction instantly up to the apposite white level, so that the white balance correcting action can be speedily accomplished.

Embodiment VIII

Figure 18:
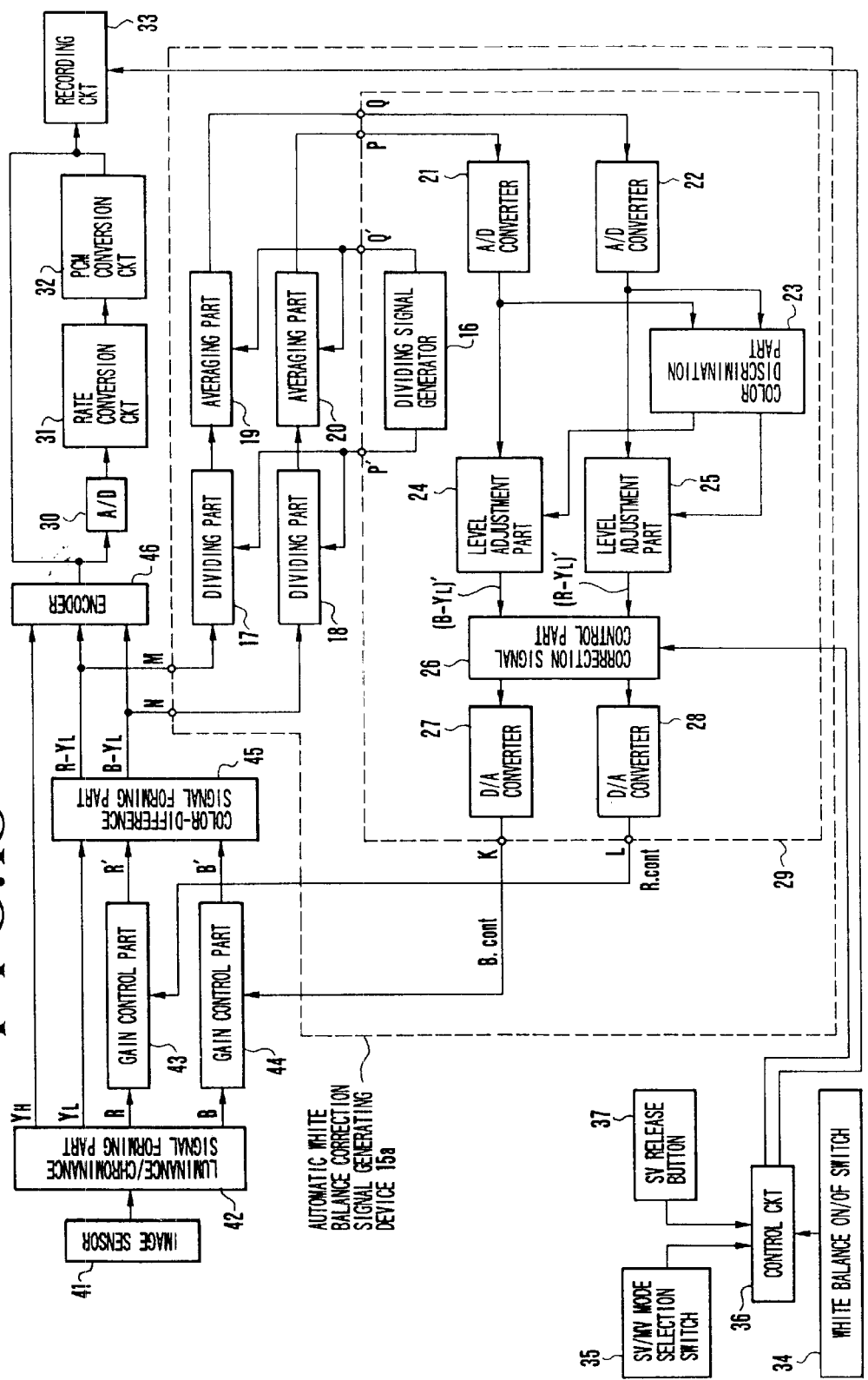
FIG. 18 is a block diagram showing the arrangement of an eighth embodiment of this invention.

FIG. 18 is a block diagram showing an eighth embodiment of this invention. In FIG. 18, parts which are the same or similar to those shown in FIG. 17 are indicated by the same reference numerals. As shown in FIG. 18, the eighth embodiment is provided with an SV release button 37 for SV (still image shooting). When the SV release button 37 is operated, the control circuit 36 detects the still image shooting mode. Under the release condition, therefore, the white balance correcting action is performed in the still image shooting mode to permit a high-speed white balance correcting action.

Figure 19:
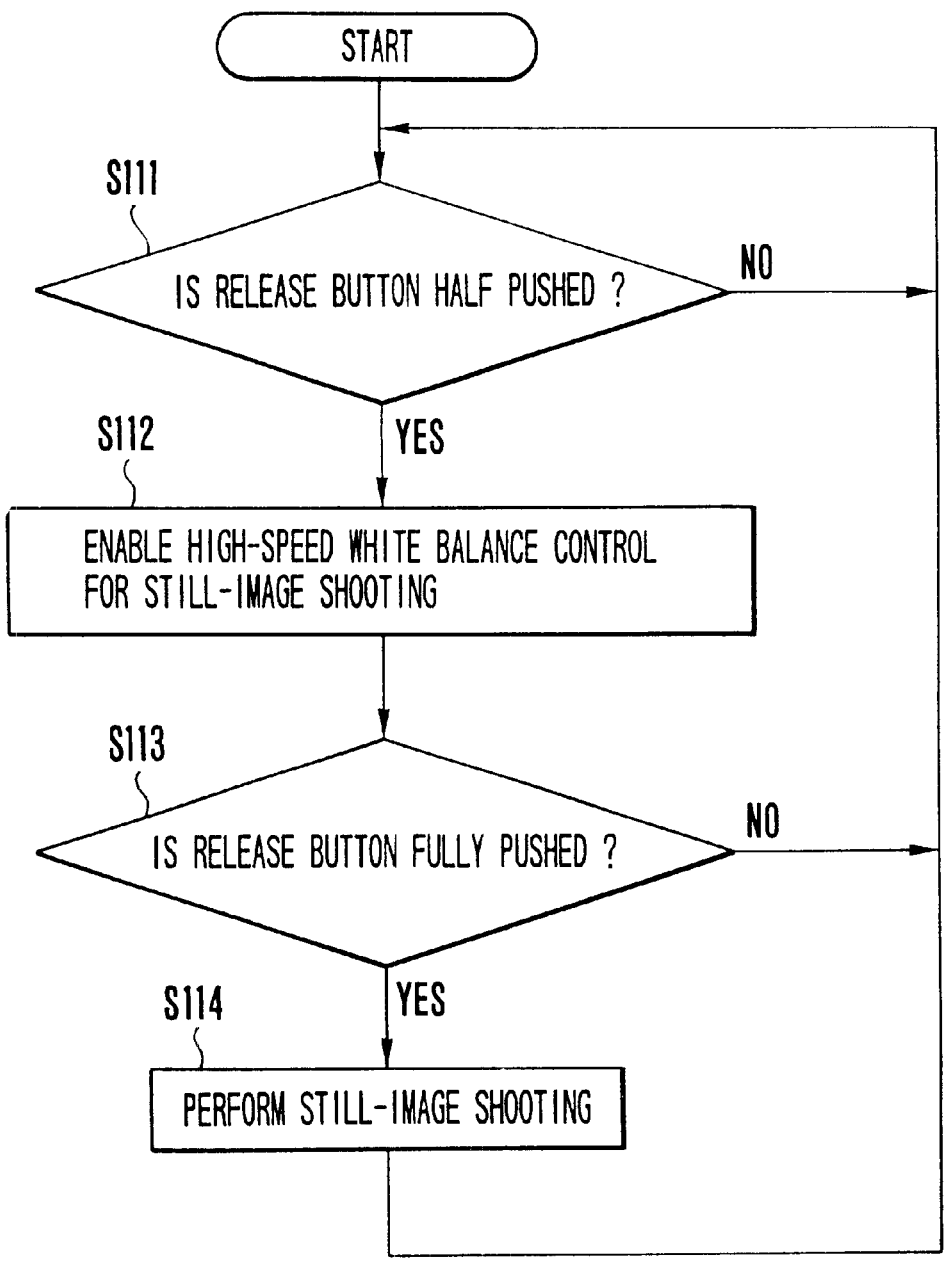
FIG. 19 is a flow chart showing the operation of the circuit arrangement shown in FIG. 18.

FIG. 19 is a flow chart showing the operation of the circuit arrangement of FIG. 18. Referring to FIG. 19, a check is made for a half-pushed state of the release button at a step S111. If the release button is judged to be in the half-pushed state, the flow comes to a step S112. At the step S112: The white balance correcting action is allowed to be accomplished at a high speed for the still image shooting. At a next step S113: A check is made to find if the release switch is fully pushed. If so, the flow comes to a step S114. At the step S114: A still image is recorded by A/D converting, rate converting and PCM converting a video signal.

Each of the seventh and eighth embodiments is arranged to permit adequate shooting and recording by detecting the shooting mode and by performing white balance correction control either at a high speed adapted for the still image shooting in the still image shooting mode or in a smooth manner adapted for the moving image shooting in the moving image shooting mode.

The following describes some embodiments of the invention that are arranged with attention given to backlight correction control:

Similar to the above-stated white balance control, the characteristic of the backlight correction control required for the still image shooting differs from the characteristic required for the moving image shooting.

In cases where the luminance of the object greatly differs from that of the background like in the case of a backlight shot, the image obtained under such a condition becomes unnatural with the object image excessively darkened. To prevent this, there has been proposed a light measuring method of measuring light by attaching a weight to a part of the image plane such as the inside of a frame set in the central part where the probability of having a main object image located on the image plane is high. Another method proposed for this purpose is an evaluative light measuring method. According to that method, light is evaluatively measured by using a plurality of light measuring frames arranged to differ in area from each other within the image plane, and light measurement information is corrected according to the result of evaluation.

Since, in the case of still image shooting, the object image is instantly frozen, the backlight correcting action must be accomplished at a high speed in order to secure a shutter opportunity. The backlight correcting action must be quickly and accurately controlled in shooting a still image. On the other hand, in the case of moving image shooting, the object is temporally continuous. Although the backlight correction control is preferably performed also in a short period of time, an excessively high-speed backlight corection tends to overshoot a desired exposure or to cause a repetitive control action due to the overshooting. Continuous images obtained under such a condition tend to give a disagreeable impression. Hence, in the case of the moving image shooting, the backlight correction control is preferably performed in a smooth manner rather than at a high speed. Therefore, if the backlight correction control is applied in the same manner both to moving image shooting and to still image shooting, it is hardly possible to adequately perform the control for each of the two different shooting modes.

In view of the above-stated problem, the embodiments described below are arranged to detect the shooting mode selected and, in the event of the still image shooting mode, to increase the amount of backlight correction to be made at a time, so that the backlight correction control can be accomplished at a high speed.

The arrangement of each of these embodiments is summarized as follows: A magnetic recording image pickup apparatus capable of selectively recording either moving images or still images comprises: light measuring means arranged to perform weighted light measurement on the basis of a light measuring area set in a specific position within an image plane; level detecting means for detecting luminance signal levels obtained from a plurality of light measuring areas set within the image plane; determining means for determining a backlight condition of an object on the basis of an output of the level detecting means; correcting means for correcting, on the basis of the result of determination made by the determining means, a measured light signal obtained from the light measuring means under a backlight shooting condition; mode detecting means for detecting a still image shooting mode; and control means for performing control in such a way as to make the amount of correction to be made at a time greater than the amount of correction for a moving image shooting when the still image shooting mode is detected by the mode detecting means.

The embodiment is arranged to detect the mode of shooting, to perform the backlight correction control at a high speed by increasing the amount of correction to be made at a time in the event of the still image shooting mode, and to perform the backlight correction control as smoothly and accurately as possible by decreasing the amount of correction to be made at a time in the case of the moving image shooting mode. Therefore, the backlight correction control can be accomplished appositely to each of the different shooting modes.

The details of the above-stated embodiments are described below with reference to the drawings:

Embodiment IX

Figure 22:
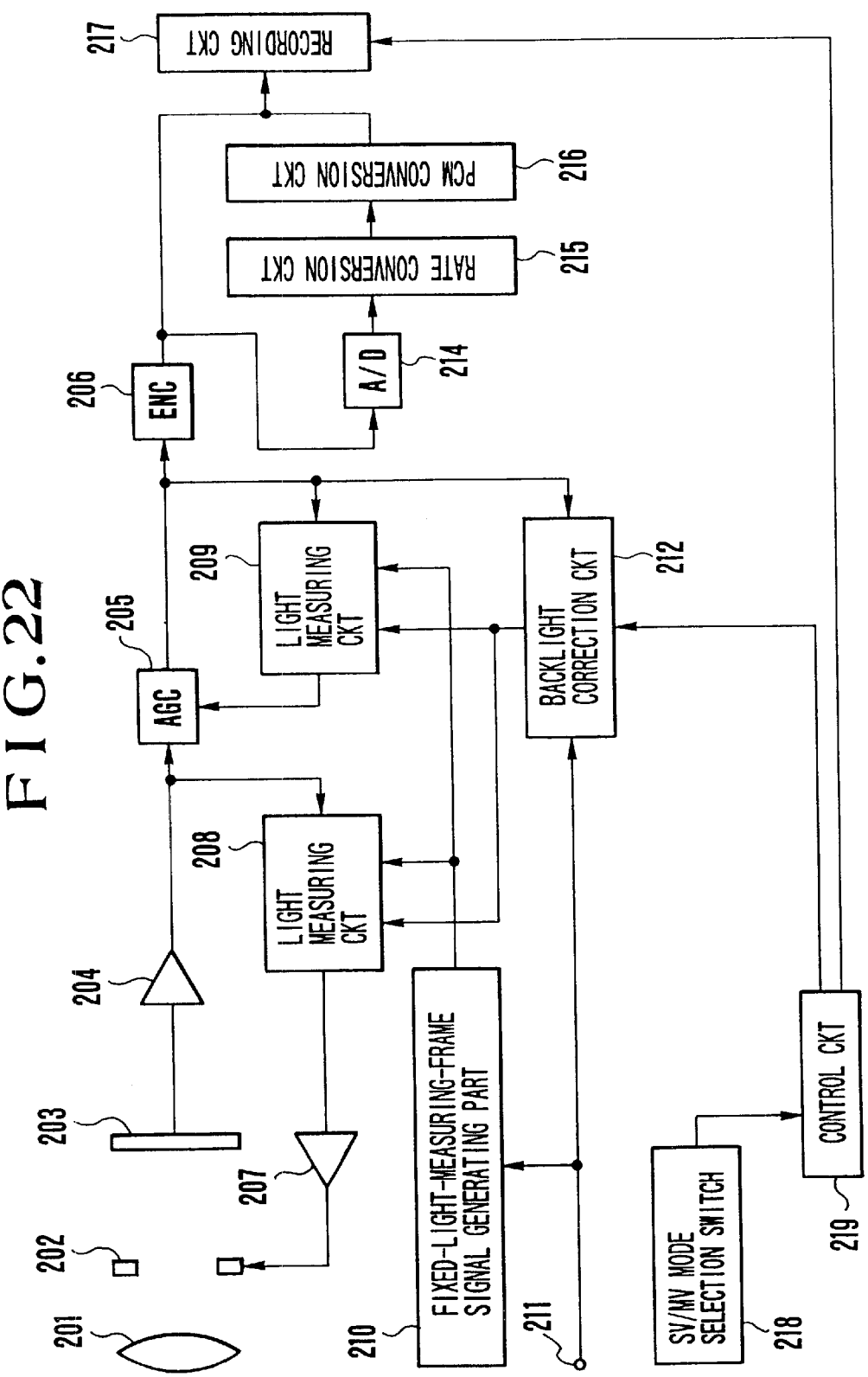
FIG. 22 is a block diagram showing the circuit arrangement of a magnetic recording/image pickup apparatus arranged as a ninth embodiment of this invention.

FIG. 22 shows the circuit arrangement of a ninth embodiment of this invention. The illustration includes an A/D conversion circuit 214; a rate conversion circuit 215; a PCM conversion circuit 216; a recording circuit 217; a mode selection switch 218 for switching the shooting mode between an MV (moving image shooting) mode and an SV (still image shooting) mode; and a control circuit 219. The control circuit 219 is arranged to detect the shooting mode and to cause the recording circuit 217 to perform recording in the mode detected.

The illustration of FIG. 22 further includes a photo-taking lens 201; an iris 202 which is arranged to control the quantity of incident light; an image sensor 203 which is a CCD (charge-coupled device) or the like; a buffer amplifier 204; an AGC (automatic gain control) circuit 205; a light measuring circuit 208 which is arranged to measure light on the basis of the output of the buffer amplifier 204 according to a fixed-frame signal coming from a fixed-light-measuring-frame signal generating circuit 210 and a correction signal coming from a backlight correction circuit 212; and another light measuring circuit 209 which is arranged likewise to measure light on the basis of the output of the AGC circuit 205. The fixed-light-measuring-frame signal generating circuit 210 is arranged to gate a video signal to pass only a video signal portion that corresponds to the position of a light measuring frame imaginarily set on the image plane; and, as a result of gating, to generate a fixed-light-measuring-frame signal for measuring light on the basis of a signal obtained from within the light measuring frame.

An iris driving circuit 207 is arranged to control the amount of aperture by driving the iris 202 according to the output of the light measuring circuit 208. A reference numeral 206 denotes an encoder circuit. A terminal 211 is arranged to receive a composite synchronizing signal which is used for setting the light measuring frame.

With the embodiment arranged as described above, incident light which comes through the lens 201 and the iris 202 to fall on the image sensor 203 is photoelectrically converted into an electrical signal. This electrical signal is supplied to the AGC circuit 205 to be subjected to a signal processing action including gain control, etc. The signal is divided into a luminance signal and color-difference signals. The signal from the AGC circuit 205 is inputted to the encoder (ENC) circuit 206. The signal inputted to the encoder circuit 206 is also inputted to the backlight correction circuit 212. The backlight correction circuit 212 determines the state of backlight by comparing the output level of the AGC circuit 205 with a reference value. The circuit 212 sends a correction signal indicating a correction amount decided according to the result of comparison to the light measuring circuits 208 and 209. Upon receipt of the correction signal, the light measuring circuits 208 and 209 drive the iris 202 and the AGC circuit 205. As a result, the light measurement is accomplished with the adverse effect of a backlight condition adequately corrected, so that the object image can be prevented from being excessively darkened.

In this instance, the control circuit 219 operates according to the shooting mode detected from the mode selection switch 218 to cause the backlight correction circuit 212 to lower the amount of correction to be made at a time in such a way as to have the amount of correction outputted little by little up to a desired amount of exposure if the moving image shooting mode is selected. Therefore, the backlight correction can be smoothly carried out in the moving image shooting mode.

If the mode detected from the mode selection switch 218 is the still image shooting mode, the control circuit 219 causes the backlight correction circuit 212 to increase the amount of correction to be made at a time in such a way as to have the correction instantly carried out up to an amount apposite to a desired exposure. The backlight correction thus can be carried out at a high speed in the still image shooting mode.

Embodiment X

Figure 23:
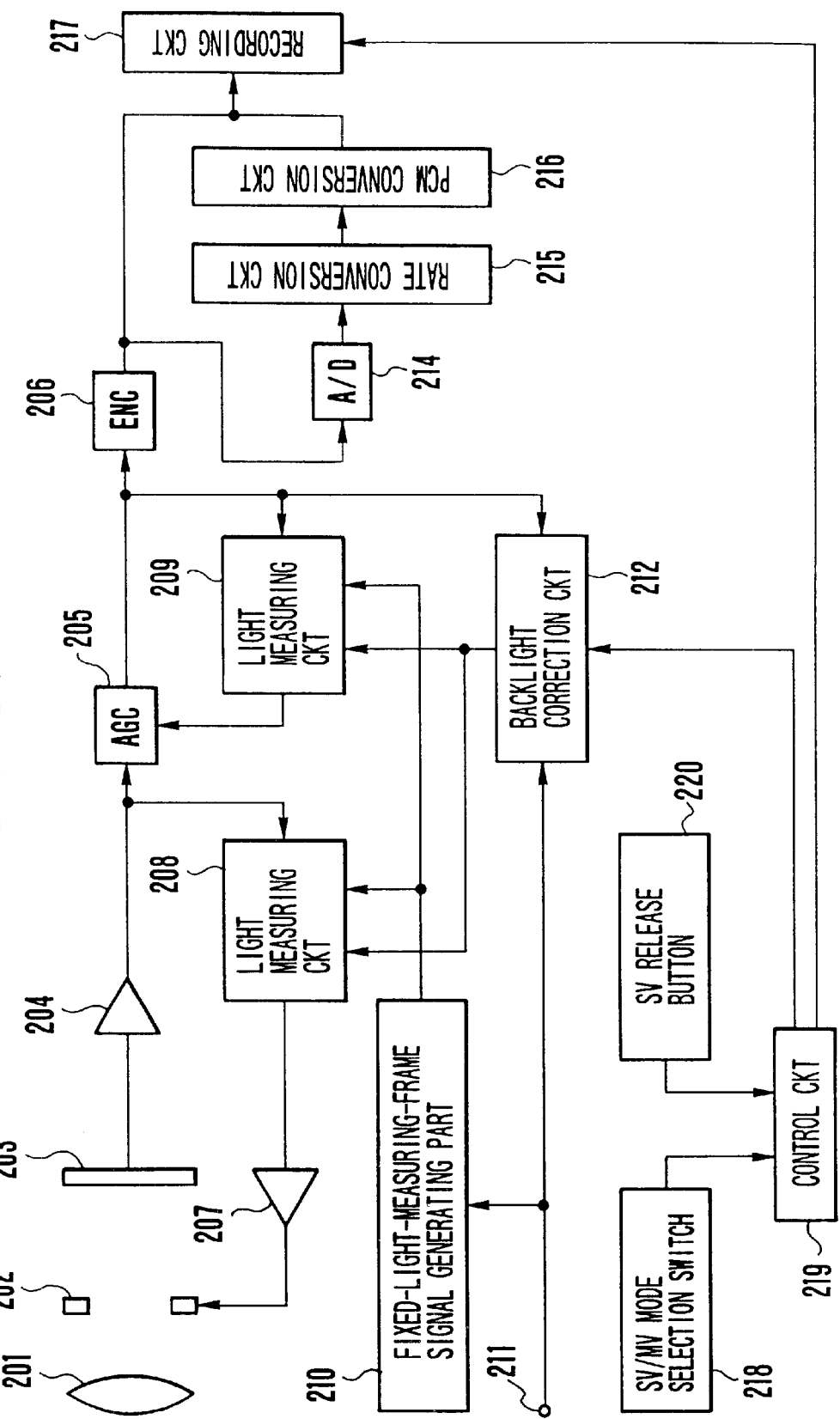
FIG. 23 is a block diagram showing the circuit arrangement of a magnetic recording/image pickup apparatus arranged as a tenth embodiment of this invention.

A tenth embodiment of this invention is provided with an SV release button 220 as shown in FIG. 23. In this case, the control circuit 219 is arranged to detect the still image shooting mode when the SV release button 220 is operated for a release. In the state of the release, an exposure correcting action is performed at a high speed in the still image shooting mode.

Figure 24:
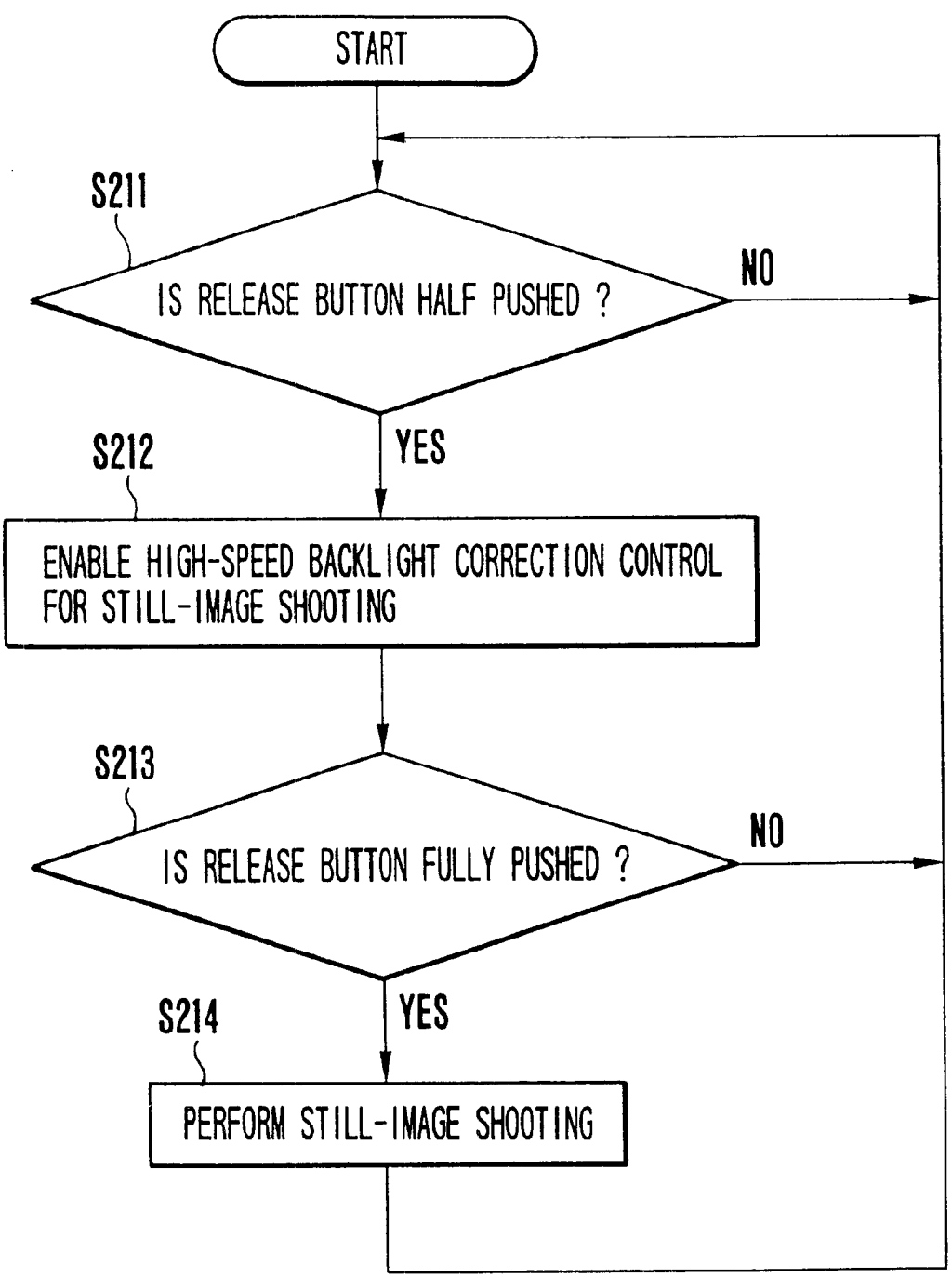
FIG. 24 is a flow chart showing the control procedures of the tenth embodiment of this invention.

FIG. 24 is a flow chart showing the procedures of control to be performed by the control circuit 219. Referring to the flow chart of FIG. 24, a check is made at a step S211 to find if the release button 220 is in a half-pushed state. If so, the flow comes to a next step S212. At the step S212: The exposure correcting action is controlled to be performed at a high speed for still image shooting. At a step S213: A check is made for the fully-pushed state of the release button 220. If the release button 220 is found to be in the fully-pushed state, the flow comes to a step S214. At the step S214: The video signal is subjected to A/D conversion, rate conversion and PCM conversion processes. After that, the recording circuit 217 is caused to record a still image thus obtained.

As described above, the ninth and tenth embodiments are arranged to detect the shooting mode, and to carry out the backlight correction control at a high speed apposite to still image shooting in the case of the still image shooting mode or in a smooth manner apposite to moving image shooting if the shooting mode is the moving image shooting mode. Therefore, the shooting and recording actions can be accomplished appositely to each of the different shooting modes.

Some of the embodiments of this invention are arranged with attention given to the shutter speed. The arrangement of such embodiments is summarized as follows:

A recording image pickup apparatus capable of shooting still images as well as moving images comprises: instructing means for giving an instruction for commencement of still image shooting; detecting means for detecting information on an aperture value and information on an image pickup gain; and control means for controlling a shutter speed and an aperture value of an image sensor on the basis of the instruction for commencement of the still image shooting and an output of the detecting means.

In cases where a high shutter speed is judged to be allowable on the basis of the aperture value and the gain of the AGC, the embodiment controls and increases the shutter speed to a speed apposite to still image shooting, so that an image shake which tends to take place in shooting a still image can be prevented.

The details of these embodiments are as follows:

Embodiment XI

Figure 25:
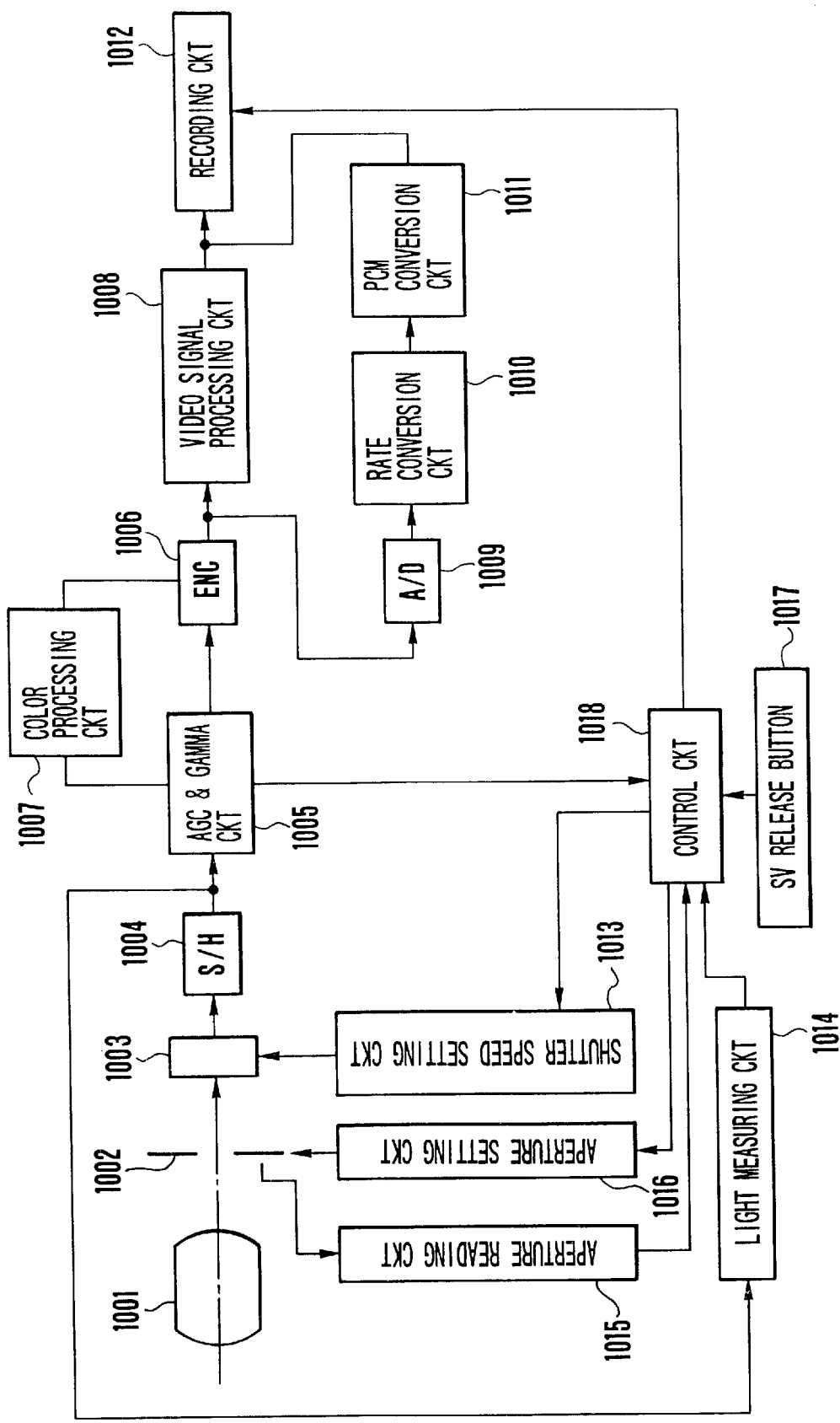
FIG. 25 is a block diagram showing an eleventh embodiment of this invention.

FIG. 25 is a block diagram showing an eleventh embodiment of this invention. The illustration includes a lens group 1001; an iris 1002; a CCD (image sensor) 1003; a sample-and-hold (S/H) circuit 1004; camera signal processing circuits 1005, 1006 and 1007; an AGC correction and gamma circuit 1005; an encoder 1006; a color processing circuit 1007; a video signal processing circuit 1008; an A/D conversion circuit 1009; a rate conversion circuit 1010; a PCM conversion circuit 1011; a recording circuit 1012; a shutter speed setting circuit 1013; a light measuring circuit 1014; an aperture reading circuit 1015; an aperture setting circuit 1016; a release button 1017 for still image shooting; and a control circuit 1018.

The control circuit 1018 is arranged to control the shutter speed, etc., according to the signal of the release button, information on the aperture and information on the AGC gain.

Figure 26:
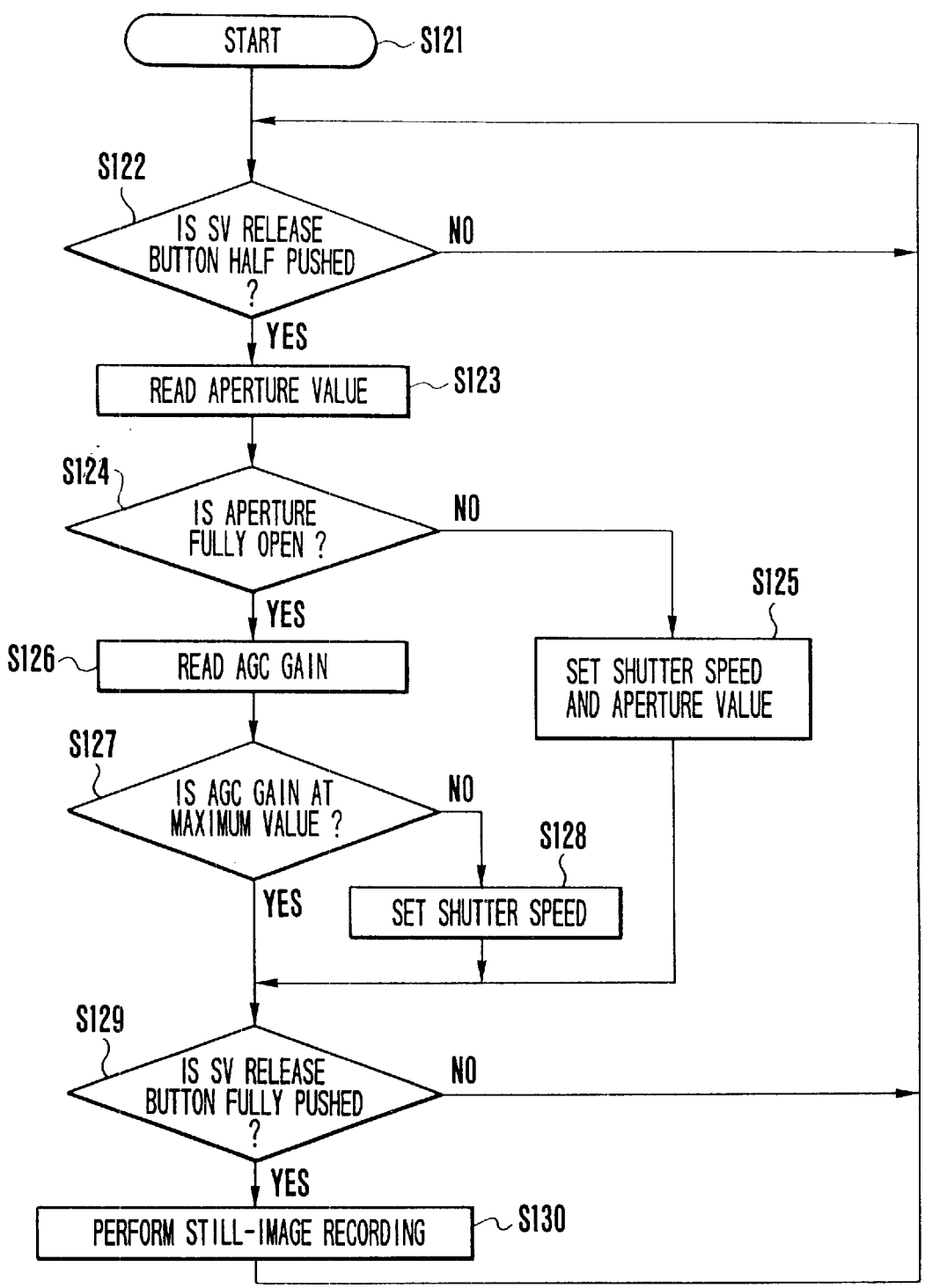
FIG. 26 is a flow chart showing the operation procedures of a control circuit shown in FIG. 25.

FIG. 26 is a flow chart which shows the flow of the operation of the control circuit 1018 and consists of steps S121 to S130. The flow of operation is as follows:

At the step S122: A check is made for the half-pushed state (on by one step) of the release button 1017. If so, the flow comes to a step S123. At the step S123: The control circuit 1018 reads aperture value information from the aperture reading circuit 1015. At a step S124: The aperture value is checked to find if it indicates a full-open sate. If not, the flow comes to a step S125. At the step S125: A shutter speed value and an aperture value are set on the basis of the relation between the shutter speed and the aperture as shown in FIG. 27(A). Referring to FIG. 27(A), if the read value of aperture is F4.0 while the full-open aperture is F2.0, for example, the aperture can be opened by two steps to F4.0 and the shutter speed can be set at 1/125 sec or 1/250 sec. If the aperture is found to be fully open, the flow comes to a step S126 to read the AGC gain. At a next step S127: The AGC gain is checked to find if it is a maximum value. If not, the flow comes to a step S128. At the step S128: A shutter speed is set on the basis of a relation between the shutter speed and the AGC gain as shown in FIG. 27(B).

The shutter speed thus can be set at a higher speed apposite to still image shooting in cases where the shutter speed is found to be increasable on the basis of the aperture value or the AGC gain.

At a step S129: A check is made for the fully-pushed state (on by two steps) of the release button 1017. If the release button 1017 is found to be in the fully-pushed state, the flow comes to a step S130 for still image shooting. If the release button 1017 is found to be in the half-pushed state, the shutter speed setting process continues. If the release button 1017 is found to be in an off-state, the embodiment comes back to its normal moving image shooting state for which the shutter speed is at 1/60 sec.

Embodiment XII

Figure 28:
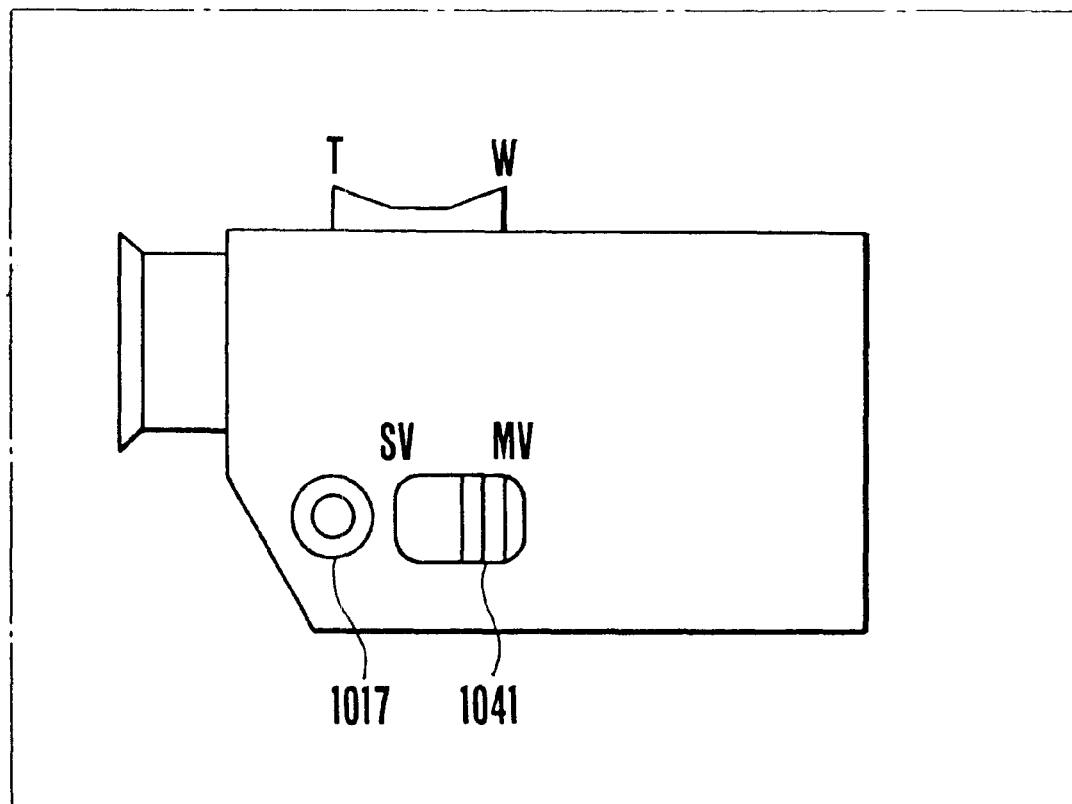
FIG. 28 shows the arrangement of a twelfth embodiment of this invention.

The eleventh embodiment described above is arranged to increase the shutter speed in response to an instruction given from the still image shooting release button 1017. However, in the case of a twelfth embodiment of the invention, that arrangement is changed to arrange a mode selection switch 1041 for switching between the moving image shooting (MV) mode and the still image shooting (SV) mode in combination with the still image shooting release button 1017, as shown in FIG. 28.

Figure 29:
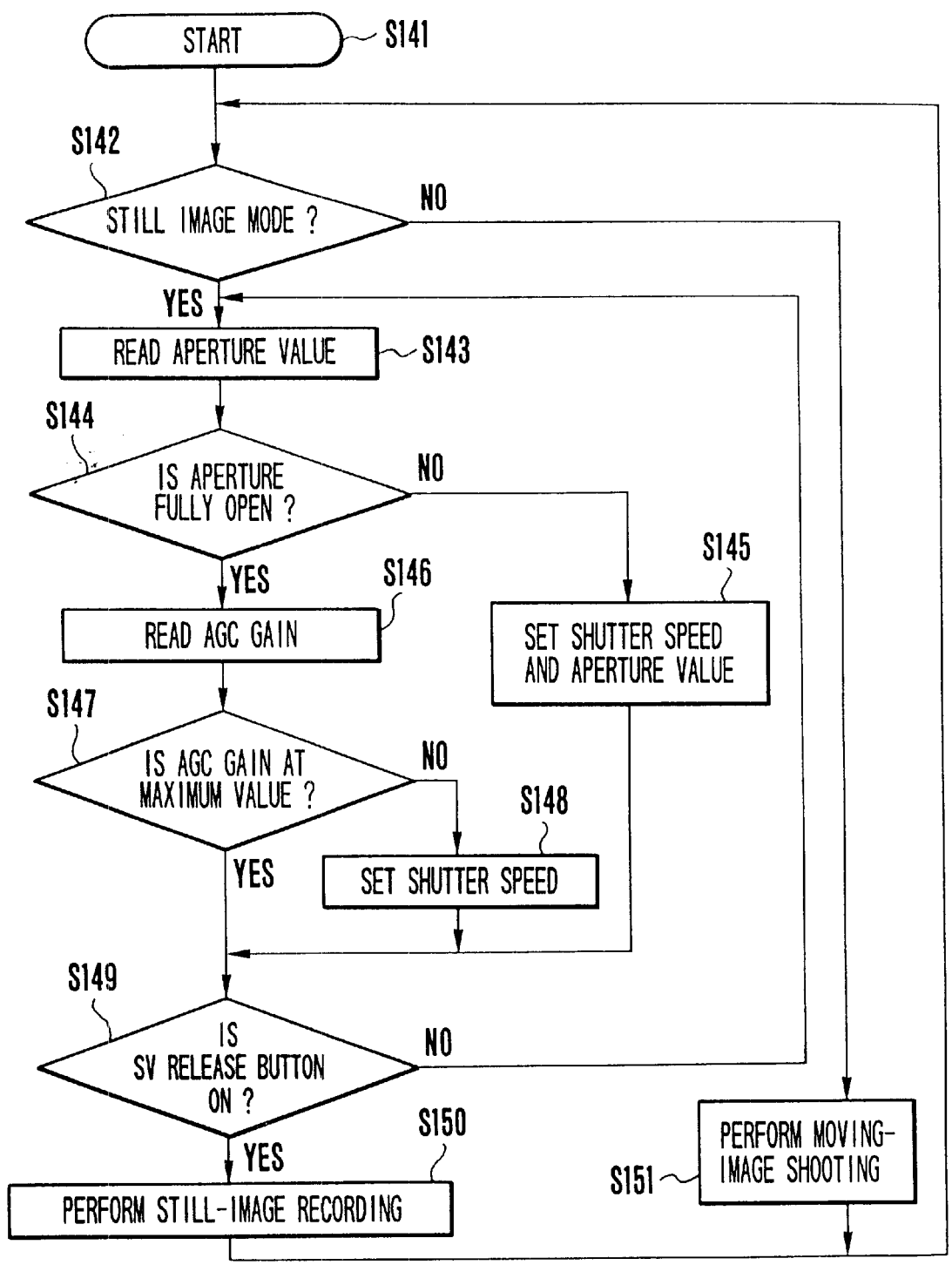
FIG. 29 is a flow chart showing the control procedures of the twelfth embodiment of this invention.

FIG. 29 shows the flow of control operation of the twelfth embodiment. At a step S142: A check is made for the still image shooting mode. If the shooting mode is found to be the still image shooting mode, the shutter speed is set at a high speed on the basis of the aperture value and the AGC gain through steps S143, S144, S145, S146, S147 and S148.

At a step S149: If the still image shooting release button 1017 is turned on, the flow comes to a step S150 to have the still image shooting carried out. Further, in a case where the shooting mode is found to be the moving image shooting mode at the step S142, the flow comes to a step S151 to have the moving image shooting carried out at the normal shutter speed of 1/60 sec.

As described above, the eleventh and twelfth embodiments are arranged such that, in the still image shooting mode, the shutter speed which is normally 1/60 sec for the moving image shooting is increased to a speed apposite to the still image shooting on the basis of the aperture value and the AGC gain. Therefore, in the case of the still image shooting, an image shake due to hand vibrations, etc., can be prevented by virtue of the higher shutter speed.

What is claimed is:

1. A recording apparatus capable of recording a still image and a moving image, comprising:

detecting means for detecting a release signal for recording the still image;

control means arranged to inhibit driving control of a driving part for a zooming and focusing operation arranged to drive a photo-taking optical system, is response to release signal is detected by said detecting means in a still image recording mode.

2. A recording apparatus capable of recording a still image and a moving image, comprising:

image sensing means;

recording means having a still image recording mode for recording the still image and a moving image recording mode for recording the moving image;

detecting means for detecting an operation state of camera control in the still image recording mode; and control means, in responsive to the output of said detecting means, for controlling said recording means to inhibit an execution of a still image recording operation when the operation state of camera control for controlling said image sensing means is in a transition period.

3. An apparatus according to claim 2, wherein said camera control is at least one of automatic white balance control, aperture control and automatic gain control.

4. An apparatus according to claim 3, wherein said control means inhibits the execution of the still image recording operation of said recording means during the transition period that control parameters of said automatic white balance control, said aperture control and said automatic gain control being changed on the basis of an image sensing state.

5. An image pickup apparatus capable of selectively performing both moving image recording and still image recording, comprising:

light measuring means for performing weighted light measurement on the basis of a light measuring area set in a predetermined position within an image plane;

level detecting means for detecting levels of luminance signals obtained from a plurality of light measuring areas set within the image plane;

determining means for determining a backlight state of an object to be recorded on the basis of an output of said level detecting means;

correction means for correcting a measured light signal outputted from said light measuring means under a backlight shooting condition on the basis of the result of determination made by said determining means; and control means for performing control in such a manner that a unit of correction step of said correction means in a still image shooting mode is greater than a unit of correction step in a moving image shooting mode.

* * * * *